(12) United States Patent
Kato et al.

(10) Patent No.: US 9,326,276 B2
(45) Date of Patent: Apr. 26, 2016

(54) WIRELESS COMMUNICATION SYSTEM, BASE STATION APPARATUS, MOBILE STATION APPARATUS, WIRELESS COMMUNICATION METHOD, AND INTEGRATED CIRCUIT

(75) Inventors: Yasuyuki Kato, Osaka (JP); Katsunari Uemura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 115 days.

(21) Appl. No.: 14/130,728

(22) PCT Filed: Jun. 22, 2012

(86) PCT No.: PCT/JP2012/065969
§ 371 (c)(1),
(2), (4) Date: Jan. 3, 2014

(87) PCT Pub. No.: WO2013/005581
PCT Pub. Date: Jan. 10, 2013

(65) Prior Publication Data
US 2014/0126516 A1     May 8, 2014

(30) Foreign Application Priority Data
Jul. 5, 2011   (JP) .................................. 2011-148749

(51) Int. Cl.
H04W 72/04 (2009.01)
H04W 74/08 (2009.01)
H04W 74/00 (2009.01)
H04W 56/00 (2009.01)

(52) U.S. Cl.
CPC ...... *H04W 72/0413* (2013.01); *H04W 74/0833* (2013.01); *H04W 56/0045* (2013.01); *H04W 74/006* (2013.01)

(58) Field of Classification Search
None
See application file for complete search history.

(56) References Cited

U.S. PATENT DOCUMENTS

2012/0172048 A1   7/2012   Kato et al.
2012/0300701 A1   11/2012  Uemura et al.
(Continued)

FOREIGN PATENT DOCUMENTS

CN   102036411 A   4/2011
JP   2011-35860 A  2/2011
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300, V10.3.0, (Mar. 2011), pp. 1-197.

(Continued)

*Primary Examiner* — Benjamin H Elliott, IV
(74) *Attorney, Agent, or Firm* — Birch, Stewart, Kolasch & Birch, LLP

(57) ABSTRACT

A mobile station apparatus performs an efficient random access procedure. A base station apparatus includes all parameters of random access information in setting information regarding at least one of a plurality of cells and part of the parameters of the random access information in setting information regarding at least one of the plurality of cells and transmits the setting information to the mobile station apparatus. The mobile station apparatus executes the random access procedure for the cells for which the random access information is included in the transmitted setting information.

8 Claims, 12 Drawing Sheets

(56) References Cited

U.S. PATENT DOCUMENTS

| | | | |
|---|---|---|---|
| 2013/0051307 A1* | 2/2013 | Fan | 370/315 |
| 2013/0215848 A1* | 8/2013 | Kato et al. | 370/329 |
| 2013/0250902 A1* | 9/2013 | Xu et al. | 370/329 |
| 2013/0258862 A1* | 10/2013 | Dinan | 370/241 |
| 2014/0126516 A1* | 5/2014 | Kato et al. | 370/329 |

FOREIGN PATENT DOCUMENTS

| | | |
|---|---|---|
| JP | 2011-124713 A | 6/2011 |
| JP | 2012-39400 A | 2/2012 |
| WO | WO 2012/017841 A1 | 2/2012 |

OTHER PUBLICATIONS

3GPP, "3rd Generation Partnership Project; Technical Specification Group Radio Access Network; Evolved Universal Terrestrial Radio Access (E-UTRA); Further advancements for E-UTRA physical layer aspects (Release 9)", 3GPP TR 36.814, V9.0.0, (Mar. 2010), pp. 1-104.

3GPP, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331, V10.1.0, (Mar. 2011), pp. 1-290.

Nokia Siemens Networks et al., "Multiple TA," 3GPP TSG-RAN WG2 Meeting #74, Barcelona, Spain, May 9-13, 2011, 2 pages, R2-112945.

Panasonic, "RACH on SCell for supporting Multiple Timing Advance," 3GPP TSG-RAN WG2 Meeting #74, Barcelona, Spain, May 9-13, 2011, 2 pages.

Huawei, 3GPP TSG-RAN WG4#50bis R4-091143, Mar. 23/27, 2009 (7 pages).

* cited by examiner

WIRELESS COMMUNICATION SYSTEM, BASE STATION APPARATUS, MOBILE STATION APPARATUS, WIRELESS COMMUNICATION METHOD, AND INTEGRATED CIRCUIT

TECHNICAL FIELD

The present invention relates to a base station apparatus, a mobile station apparatus, and a wireless communication system, and, more specifically, relates to a wireless communication system, a base station apparatus, a mobile station apparatus, a wireless communication method, and an integrated circuit in an operation at a time when the transmission timing of an uplink is transmitted.

BACKGROUND ART

In the 3GPP (3rd Generation Partnership Project), a W-CDMA method has been standardized as a third generation cellular mobile communication method, and services using the W-CDMA method are sequentially beginning. In addition, HSDPA, in which communication speed is further increased, has also been standardized, and services using the HSDPA are beginning.

On the other hand, in the 3GPP, Evolved Universal Terrestrial Radio Access (hereinafter referred to as "EUTRA") has also been standardized, and services using the EUTRA are beginning. As a communication method for a downlink of the EUTRA, an OFDM (Orthogonal Frequency Division Multiplexing) method, which is resistant to multipath interference and suitable for high-speed communication, is adopted. In addition, as a communication method for an uplink, a DFT (Discrete Fourier Transform)-spread OFDM method of Single Carrier-Frequency Division Multiple Access SC-FDMA, in which the cost and the power consumption of a mobile station apparatus can be taken into consideration and the Peak to Average Power Ratio PARR of transmission signals can be reduced, is adopted.

In addition, in the 3GPP, Advanced-EUTRA, which is a further evolution of the EUTRA, is also being standardized. In the Advanced-EUTRA, it is assumed that a band having a bandwidth of 100 MHz at maximum is used in each of an uplink and a downlink and communication at transmission rates of a maximum of 1 Gbps or higher in the downlink and a maximum of 500 Mbps or higher in the uplink is performed.

In the Advanced-EUTRA, it is planned that a band of a maximum of 100 MHz is realized by grouping a plurality of bands of the EUTRA lower than or equal to 20 MHz so that mobile station apparatuses of the EUTRA can be included. It is to be noted that in the Advanced-EUTRA, a band of the EUTRA lower than or equal to 20 MHz is referred to as a component carrier (CC) (NPL 2). In addition, one cell is configured by combining one component carrier of the downlink and one component carrier of the uplink. It is to be noted that one cell can also be configured only by one component carrier of the downlink. A base station apparatus assigns a plurality of cells to a mobile station apparatus, and communicates with the mobile station apparatus through the assigned cells.

CITATION LIST

Non Patent Literature

NPL 1: 3GPP TS (Technical Specification) 36.300, V10.3.0 (2011-03), Evolved Universal Terrestrial Radio Access (E-UTRA) and Evolved Universal Terrestrial Radio Access Network (E-UTRAN), Overall description Stage 2

NPL 2: 3GPP TR (Technical Specification) 36.814, V9.0.0 (2010-03), Evolved Universal Terrestrial Radio Access (E-UTRA) Further advancements for E-UTRA physical layer aspects

SUMMARY OF INVENTION

Technical Problem

When a mobile station apparatus communicates with a base station apparatus using a plurality of cells whose frequencies are different, the mobile station apparatus might connect to the base station apparatus through a repeater or the like in a cell of a certain frequency. In such a case, a timing at which the mobile station apparatus receives data from a downlink component carrier is different between the cells. Furthermore, a timing at which data is transmitted to the base station apparatus might be different between uplink component carriers of the cells. Therefore, the mobile station apparatus needs to transmit data to the base station apparatus while adjusting the transmission timing for the uplink component carrier of each cell.

Therefore, the mobile station apparatus needs to obtain transmission timing information by executing a random access procedure for the uplink component carrier of each cell. When the random access procedure is executed for all the uplink component carriers, however, a burden is placed on the mobile station apparatus.

The present invention has been conceived in view of such a circumstance, and an object thereof is to provide a mobile station apparatus, a base station apparatus, a wireless communication system, a wireless communication method, and an integrated circuit for efficiently executing the random access procedure in transmission of data using uplink component carriers whose transmission timings from the mobile station apparatus are different.

Solution to Problem (1) In order to achieve the above-described object, the present invention takes the following measures. That is, a wireless communication system in the present invention is a wireless communication system in which a base station apparatus assigns a plurality of cells to a mobile station apparatus and, during communication with the base station apparatus, the mobile station apparatus executes a random access procedure using random access information. The random access information includes two or more parameters. The base station apparatus includes all the parameters of the random access information in setting information regarding at least one of the plurality of cells and part of the parameters of the random access information in setting information regarding at least one of the plurality of cells and transmits the setting information to the mobile station apparatus. The mobile station apparatus executes the random access procedure for the cells for which the random access information is included in the transmitted setting information.

(2) In addition, in the wireless communication system in the present invention, the mobile station apparatus executes a contention based random access procedure and/or a non-contention based random access procedure for the cell for which all the parameters of the random access information are included in the setting information and executes the non-contention based random access procedure for the cell for which the part of the parameters of the random access information is included in the setting information.

(3) In addition, in the wireless communication system in the present invention, the part of the parameters of the random access information is configured only by parameters necessary for the non-contention based random access procedure.

(4) In addition, in the wireless communication system in the present invention, the mobile station apparatus obtains setting information regarding each cell again from the base station apparatus. If random access information is no longer included in the setting information regarding the cell for which all the parameters of the random access information have been set, the mobile station apparatus holds the held random access information again. If random access information is no longer included in the setting information regarding the cell for which the part of the parameters of the random access information has been set, the mobile station apparatus discards the held random access information.

(5) In addition, a base station apparatus in the present invention is a base station apparatus that assigns a plurality of cells to a mobile station apparatus and that, during communication, detects a random access preamble transmitted by the mobile station apparatus using random access information. The random access information includes two or more parameters. The base station apparatus includes all the parameters of the random access information in setting information regarding at least one of the plurality of cells and part of the parameters of the random access information in setting information regarding at least one of the plurality of cells and transmits the setting information to the mobile station apparatus.

(6) In addition, a mobile station apparatus in the present invention is a mobile station apparatus to which a plurality of cells are assigned from a base station apparatus and that, during communication with the base station apparatus, executes a random access procedure using random access information. The random access information includes two or more parameters. The mobile station apparatus receives setting information regarding the plurality of cells from the base station apparatus, and executes a non-contention based random access procedure for a cell for which part of the parameters of the random access information is included in the setting information regarding the cells.

(7) In addition, in the mobile station apparatus in the present invention, the mobile station apparatus executes a contention based random access procedure and/or the non-contention based random access procedure for a cell for which all the parameters of the random access information are included in the setting information regarding the cells.

(8) In addition, a wireless communication method in the present invention is a wireless communication method applied to a wireless communication system in which a base station apparatus assigns a plurality of cells to a mobile station apparatus and, during communication with the base station apparatus, the mobile station apparatus executes a random access procedure using random access information. The random access procedure includes two or more parameters. The wireless communication method includes a step of, using the base station apparatus, including all the parameters of the random access information in setting information regarding at least one of the plurality of cells and part of the parameters of the random access information in setting information regarding at least one of the plurality of cells and transmitting the setting information to the mobile station apparatus and a step of, using the mobile station apparatus, executing the random access procedure for the cells for which the random access information is included in the transmitted setting information.

(9) In addition, in the wireless communication method in the present invention, the wireless communication method includes a step of, using the mobile station apparatus, executing a contention based random access procedure and/or a non-contention based random access procedure for the cell for which all the parameters of the random access information are included in the setting information and executing the non-contention based random access procedure for the cell for which the part of the parameters of the random access information is included in the setting information.

(10) In addition, an integrated circuit in the present invention is an integrated circuit applied to a base station apparatus that assigns a plurality of cells to a mobile station apparatus and that, during communication, detects a random access preamble transmitted by the mobile station apparatus using random access information. The random access information includes two or more parameters. The integrated circuit includes means for including all the parameters of the random access information in setting information regarding at least one of the plurality of cells and part of the parameters of the random access information in setting information regarding at least one of the plurality of cells and means for transmitting the setting information to the mobile station apparatus.

(11) In addition, an integrated circuit in the present invention is an integrated circuit applied to a mobile station apparatus to which a plurality of cells are assigned from a base station apparatus and that, during communication with the base station apparatus, executes a random access procedure using random access information. The random access information includes two or more parameters. The integrated circuit includes means for receiving setting information regarding the plurality of cells from the base station apparatus and means for executing a non-contention based random access procedure for a cell for which part of the parameters of the random access information is included in the setting information regarding the plurality of cells.

Advantageous Effects of Invention

According to the present invention, when an uplink transmission timing is different between cells, it is sufficient if one piece of transmission timing information is transmitted for each transmission timing group, and accordingly excessive wireless resources need not be used for transmitting transmission timing information.

DESCRIPTION OF EMBODIMENTS

A downlink of EUTRA includes a downlink reference signal, a downlink synchronization channel DSCH, a physical downlink shared channel PDSCH, a physical downlink control channel PDCCH, and a physical broadcast channel PBCH.

An uplink of the EUTRA includes an uplink reference signal, a random access channel RACH, a physical uplink shared channel PUSCH, and a physical uplink control channel PUCCH. In addition, the uplink reference signal includes two types of signals, namely a demodulation reference signal and a sounding reference signal.

Figure 7:
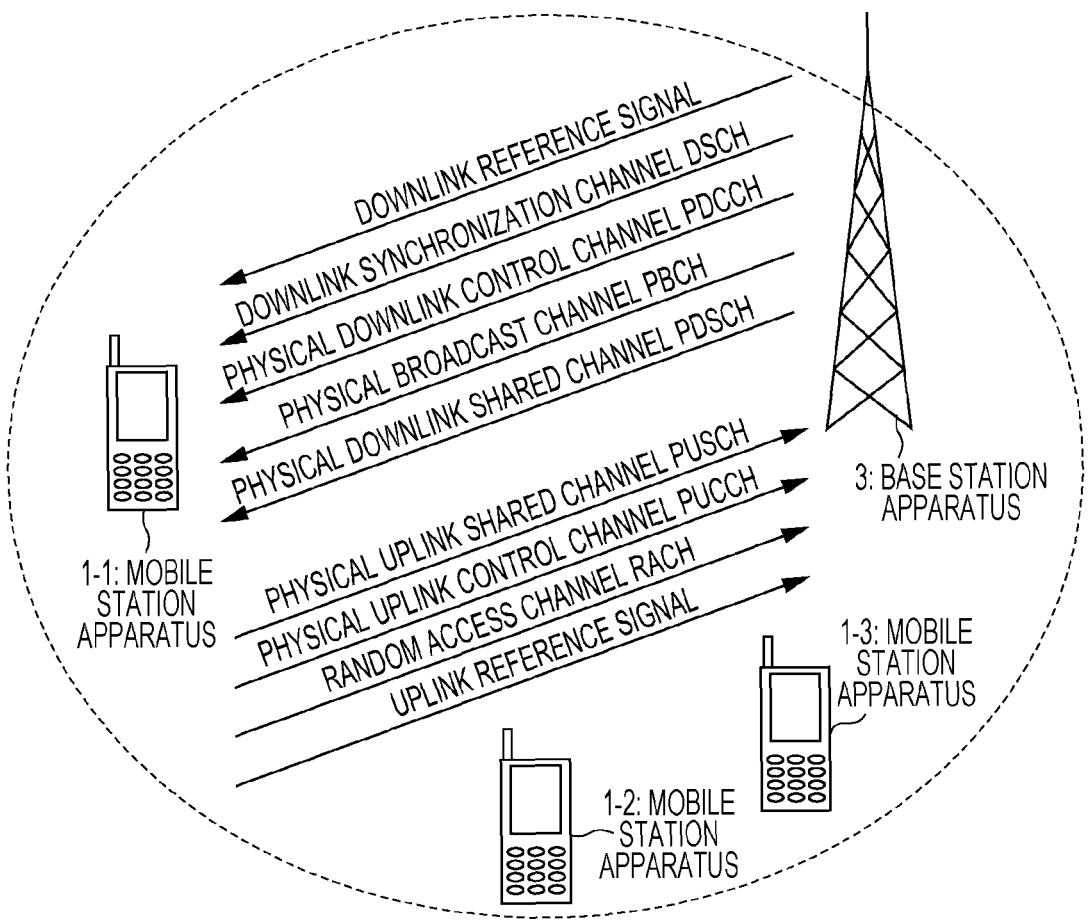
FIG. 7 is a diagram illustrating the configuration of channels in EUTRA.
Figure 8:
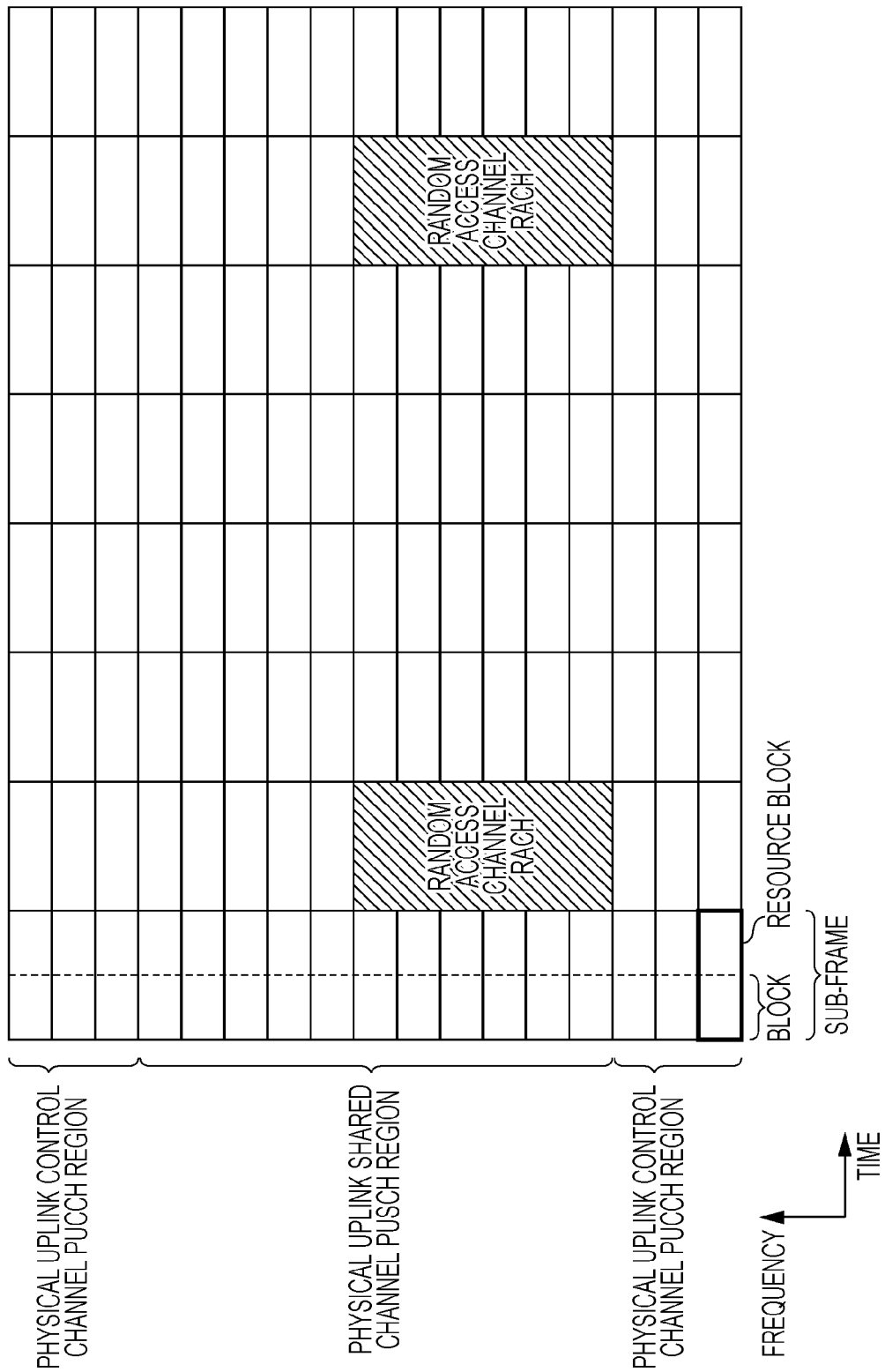
FIG. 8 is a diagram illustrating the configuration of an uplink of the EUTRA.

FIG. 7 is a diagram illustrating the channel configuration of the EUTRA, and FIG. 8 is a diagram illustrating the configuration of the uplink of the EUTRA. One block includes twelve subcarriers and seven OFDM symbols. One resource block (RB) is configured using two blocks. The physical uplink shared channel PUSCH and the physical uplink control channel PUCCH are used in units of one resource block. The random access channel RACH is configured using six resource blocks.

The uplink reference signal is disposed at a particular OFDM symbol in a resource block. In each channel of the uplink, as illustrated in FIG. 8, a region of the physical uplink shared channel PUSCH, regions of the physical uplink control channel PUCCH, and a region of the random access channel RACH are separately provided. Information regarding the regions of the physical uplink shared channel PUSCH and the physical uplink control channel PUCCH is broadcast from a base station apparatus. In addition, the base station apparatus assigns, in these regions, wireless resources of the physical uplink shared channel PUSCH and the physical uplink control channel PUCCH to each mobile station apparatus. It is to be noted that the random access channels RACH are arranged at certain intervals.

The physical downlink shared channel PDSCH is used for transmitting user data and control data from the base station apparatus to a mobile station apparatus. The physical downlink control channel PDCCH is used for transmitting control information such as information regarding assignment of wireless resources for the physical downlink shared channel PDSCH and the physical uplink shared channel PUSCH from the base station apparatus to the mobile station apparatus. The downlink reference signal is used for demodulating the physical downlink shared channel PDSCH and the physical downlink control channel PDCCH. The downlink synchronization channel DSCH is used by the mobile station apparatuses to synchronize the downlink. The physical broadcast channel PBCH is used for transmitting information regarding system information regarding cells of the base station apparatus.

The physical uplink shared channel PUSCH is used for transmitting user data and control data from the mobile station apparatus to the base station apparatus. In addition, data transmitted and received using the physical uplink shared channel PUSCH and the physical downlink shared channel PDSCH is subjected to a HARQ (Hybrid Automatic Repeat reQuest) process. The base station apparatus and the mobile station apparatus improve the data error correction performance thereof during retransmission by performing a process for combining initially transmitted data and retransmitted data during the retransmission. The physical uplink control channel PUCCH is used for transmitting control information such as a response (ACK (acknowledge)/NACK (negative acknowledge)) to data transmitted from the base station apparatus through the downlink and information regarding the wireless transmission path quality of the downlink.

The random access channel RACH is mainly used in transmission of a random access preamble from the mobile station apparatus to the base station apparatus for obtaining transmission timing information. The transmission of a random access preamble is performed in a random access procedure. The demodulation reference signals of the uplink reference signal are used by the base station apparatus to demodulate the physical uplink shared channel PUSCH. The demodulation reference signals of the uplink reference signal are inserted into the positions of a fourth symbol and an eleventh symbol of the physical uplink shared channel PUSCH. The sounding reference signal of the uplink reference signal is used by the base station apparatus to measure the wireless transmission path quality of the uplink. The sounding reference signal of the uplink reference signal is inserted into the position of a fourteenth symbol of the physical uplink shared channel PUSCH. A wireless resource for transmitting the sounding reference signal is assigned from the base station apparatus to each mobile station apparatus.

The random access procedure includes two access procedures, namely a contention based random access procedure and a non-contention based random access procedure (NPL 1).

Figure 9:
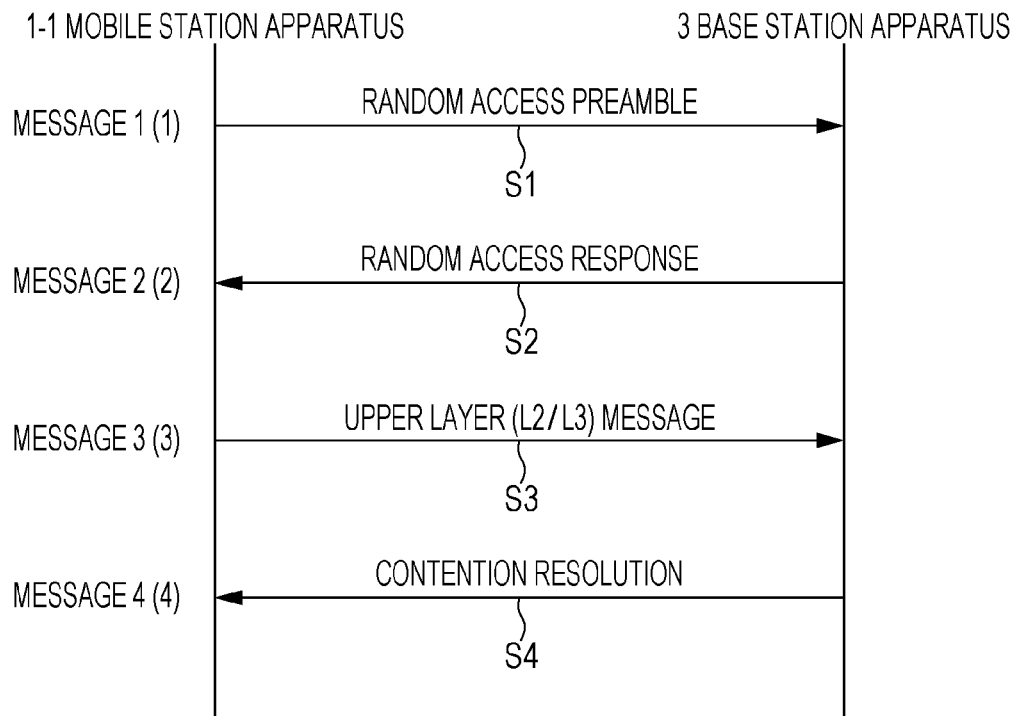
FIG. 9 is a diagram illustrating a contention based random access procedure.

FIG. 9 is a diagram illustrating the contention based random access procedure. The contention based random access procedure is a random access procedure in which contention can occur between mobile station apparatuses. The contention based random access procedure is performed, for example, (i) during initial access in a state in which connection (communication) has not been established with the base station apparatus and (ii) in a scheduling request at a time when connection has been established with the base station apparatus but transmission of uplink data has occurred in a state in which uplink synchronization has not been established.

Figure 10:
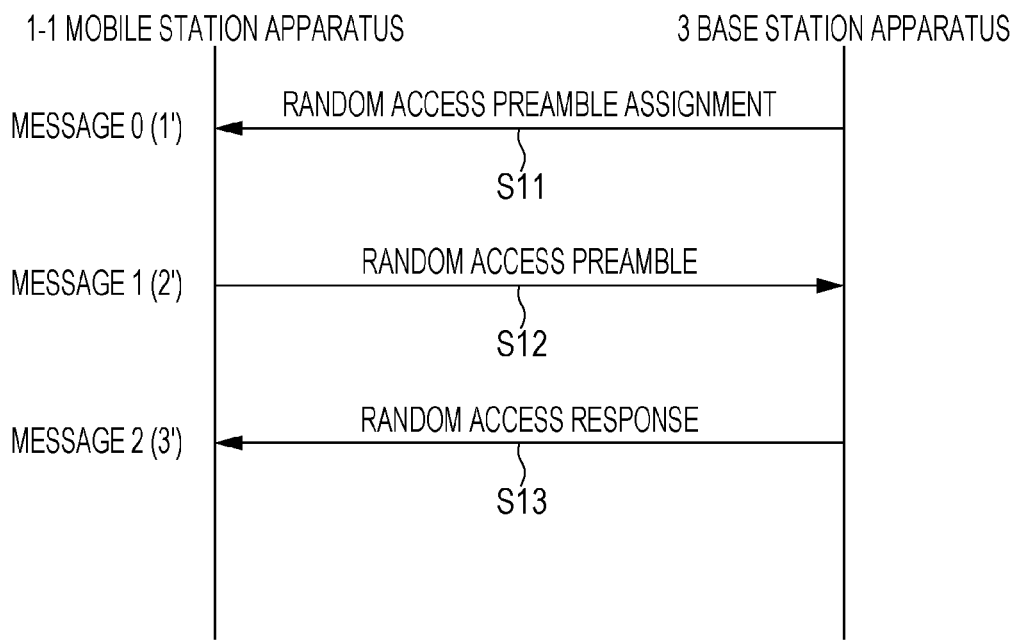
FIG. 10 is a diagram illustrating a non-contention based random access procedure.

FIG. 10 is a diagram illustrating the non-contention based random access procedure. The non-contention based random access procedure is a random access procedure in which contention does not occur between mobile station apparatuses. In the case of the non-contention based random access procedure, a mobile station apparatus begins the random access procedure when the base station apparatus has transmitted random access information to the mobile station apparatus (i) in a case in which uplink synchronization is to be rapidly established between the mobile station apparatus and the base station apparatus in a state in which the base station apparatus and the mobile station apparatus are connected to each other but the uplink synchronization has not been established and (ii) when the base station apparatus has transmitted random access specification information to a mobile station apparatus in a special case such as handover or when the transmission timing of the mobile station apparatus is not valid (NPL 1). The non-contention based random access procedure is specified in a message in the RRC (Radio Resource Control: Layer 3) layer and control data transmitted through the physical downlink control channel PDCCH.

The contention based random access procedure will be briefly described with reference to FIG. 9. First, a mobile station apparatus 1-1 transmits a random access preamble to a base station apparatus 3 (message 1:(1), step S1). Next, the base station apparatus 3 that has received the random access preamble transmits a response (random access response) to the random access preamble to the mobile station apparatus 1-1 (message 2:(2), step S2). The mobile station apparatus 1-1 transmits a message of a higher layer (Layer 2/Layer 3) on the basis of scheduling information included in the random access response (message 3:(3), step S3). The base station apparatus 3 transmits a contention resolution message to the mobile station apparatus 1-1 from which the higher layer message of (3) has been received (message 4:(4), step S4). It is to be noted that the random access preamble transmitted in the contention based random access procedure is also referred to as a "random preamble".

The non-contention based random access procedure will be briefly described with reference to FIG. 10. First, the base station apparatus 3 transmits random access specification information including a preamble number (or a sequence number) and a random access channel number to be used to the mobile station apparatus 1-1 (message 0:(1)', step S11). The mobile station apparatus 1-1 transmits a random access preamble having a specified preamble number to a specified random access channel RACH (message 1:(2)', step S12). Next, the base station apparatus 3 that has received the random access preamble transmits a response (random access response) to the random access preamble to the mobile station apparatus 1-1 (message 2:(3)', step S13). When the value of the transmitted preamble number is 0, however, the mobile station apparatus 1-1 performs the contention based random access procedure. It is to be noted that the random access preamble transmitted in the non-contention based random access procedure is also referred to as a "dedicated preamble". It is also to be noted that the random access preamble is generated using a CAZAC (Constant Amplitude Zero Auto-Correlation) sequence.

A procedure for connecting to the base station apparatus 3 performed by the mobile station apparatus 1-1 will be described with reference to FIG. 9. First, the mobile station apparatus 1-1 obtains system information regarding the base station apparatus 3 from the physical broadcast channel PBCH or the like. The mobile station apparatus 1-1 connects to the base station apparatus 3 by executing the contention based random access procedure on the basis of random access information included in the system information. The mobile station apparatus 1-1 selects and generates a random access preamble on the basis of the wireless transmission path quality of the downlink, the size of a higher layer message to be transmitted, the random access information, and the like. The mobile station apparatus 1-1 then determines, on the basis of the random access information, a random access channel RACH through which the random access preamble is to be transmitted. The mobile station apparatus 1-1 transmits the random access preamble using the determined random access channel RACH (message 1:(1)).

Upon detecting the random access preamble from the mobile station apparatus 1-1, the base station apparatus 3 calculates the amount of deviation in the transmission timing between the mobile station apparatus 1-1 and the base station apparatus 3 on the basis of the random access preamble. In addition, the base station apparatus 3 performs scheduling (specification of the position of an uplink wireless resource (the position of a physical uplink shared channel PUSCH), a transmission format (message size), and the like) in order to transmit a Layer 2 (L2)/Layer 3 (L3) message. Furthermore, the base station apparatus 3 assigns temporary C-RNTI (Cell-Radio Network Temporary Identity: mobile station apparatus identification information). In addition, the base station apparatus 3 disposes, in the physical downlink control channel PDCCH, RA-RNTI (Random-Access Radio Network Temporary Identity: random access response identification information) indicating a response (random access response) to the mobile station apparatus 1-1 that has transmitted the random access preamble through the random access channel RACH. Thereafter, the base station apparatus 3 transmits, to the mobile station apparatus 1-1, a random access response message including transmission timing information, scheduling information, the temporary C-RNTI, and information regarding the received random access preamble through the physical downlink shared channel PDSCH (message 2:(2)).

Upon detecting that there is the RA-RNTI in the physical downlink control channel PDCCH, the mobile station apparatus 1-1 checks the content of the random access response message disposed in the physical downlink shared channel PDSCH. If the information regarding the transmitted random access preamble is included, the mobile station apparatus 1-1 adjusts the transmission timing of the uplink on the basis of the transmission timing information included in the random access response message, and transmits an L2/L3 message including information for identifying the mobile station apparatus 1-1, such as C-RNTI (or temporary C-RNTI) or IMSI (International Mobile Subscriber Identity) using the scheduled wireless resource and the transmission format (message 3:(3)). When the transmission timing has been adjusted, the mobile station apparatus 1-1 starts a transmission timing timer indicating that the adjusted transmission timing is valid. It is to be noted that when the transmission timing timer has finished operating, the adjusted transmission timing becomes invalid. While the transmission timing is valid, the mobile station apparatus 1-1 may transmit data to the base station apparatus. When the transmission timing is invalid, the mobile station apparatus 1-1 may transmit only a random access preamble. In addition, a period in which the transmission timing is valid is referred to as an "uplink synchronous state". A period in which the transmission timing is not valid is referred to as an "uplink asynchronous state".

Upon receiving the L2/L3 message from the mobile station apparatus 1-1, the base station apparatus 3 transmits, to the mobile station apparatus 1-1, a contention resolution message for determining whether or not contention is occurring between mobile station apparatuses 1-1 to 1-3 using the C-RNTI (or the temporary C-RNTI) or the IMSI included in the received L2/L3 message (message 4:(4)). Upon receiving the contention resolution message, the mobile station apparatus 1-1 ends the contention based random access procedure.

It is to be noted that if the mobile station apparatus 1-1 has not detected a random access response message including a preamble number corresponding to the transmitted random access preamble in a certain period of time, if transmission of the message 3 has failed, or if the mobile station apparatus 1-1 has not detected identification information regarding the mobile station apparatus 1-1 itself in the contention resolution message in a certain period of time, the mobile station apparatus 1-1 performs the procedure again from the transmission of a random access preamble (message 1:(1)). Thereafter, when the number of random access preambles transmitted has exceeded a maximum number of random access preambles transmitted indicated by the random access information, the mobile station apparatus 1-1 determines that the random access procedure has failed, and disconnects the communication with the base station apparatus 3. It is to be noted that when the random access procedure has been successful, control data for connection is further communicated between the base station apparatus 3 and the mobile station apparatus 1-1. At this time, the base station apparatus 3 transmits, to the mobile station apparatus 1-1, assignment information regarding the uplink reference signal and the physical uplink control channel PUCCH, which are to be individually assigned.

In addition, the random access information broadcast from the base station apparatus 3 includes a plurality of parameters such as (i) random access channel setting information including number information regarding the CAZAC sequence used for generating the random access preamble and arrangement information regarding the random access channel RACH, (ii) random preamble setting information including information for selecting and generating the random preamble, such as the number of random preambles and group information regarding random preambles, and (iii) random access procedure-related information including random access preamble transmission power information, setting information regarding the maximum number of random access preambles transmitted, information regarding reception of the random access response, information regarding reception of the contention resolution, and information regarding transmission of the L2/L3 message.

Update of the transmission timing of the uplink after the completion of the random access procedure is realized when (i) the base station apparatus 3 has measured the uplink reference signal (sounding reference signal or demodulation reference signal) transmitted from the mobile station apparatus 1-1, (ii) the base station apparatus 3 has calculated transmission timing information, and (iii) the base station apparatus 3 has transmitted a transmission timing message including the calculated transmission timing information to the mobile station apparatus 1-1. After adjusting the transmission timing of the uplink on the basis of the transmission timing information transmitted from the base station apparatus 3, the mobile station apparatus 1-1 restarts the transmission timing timer. It is to be noted that the base station apparatus 3 holds the same transmission timing timer as the mobile station apparatus 1-1. When the base station apparatus 3 has transmitted the transmission timing message, the base station apparatus 3 starts the transmission timing timer or restarts the transmission timing timer. In doing so, the uplink synchronous state is managed between the base station apparatus 3 and the mobile station apparatus 1-1. When the transmission timing timer finished operating, the transmission timing becomes invalid, and uplink transmission other than transmission of a random access preamble stops.

In addition, in the 3GPP, Advanced-EUTRA, which is a further evolution of the EUTRA, is being discussed. In the Advanced-EUTRA, it is assumed that a band having a bandwidth of 100 MHz at maximum is used in each of the uplink and the downlink and communication at transmission rates of a maximum of 1 Gbps or higher in the downlink and a maximum of 500 Mbps or higher in the uplink is performed.

Figure 11:
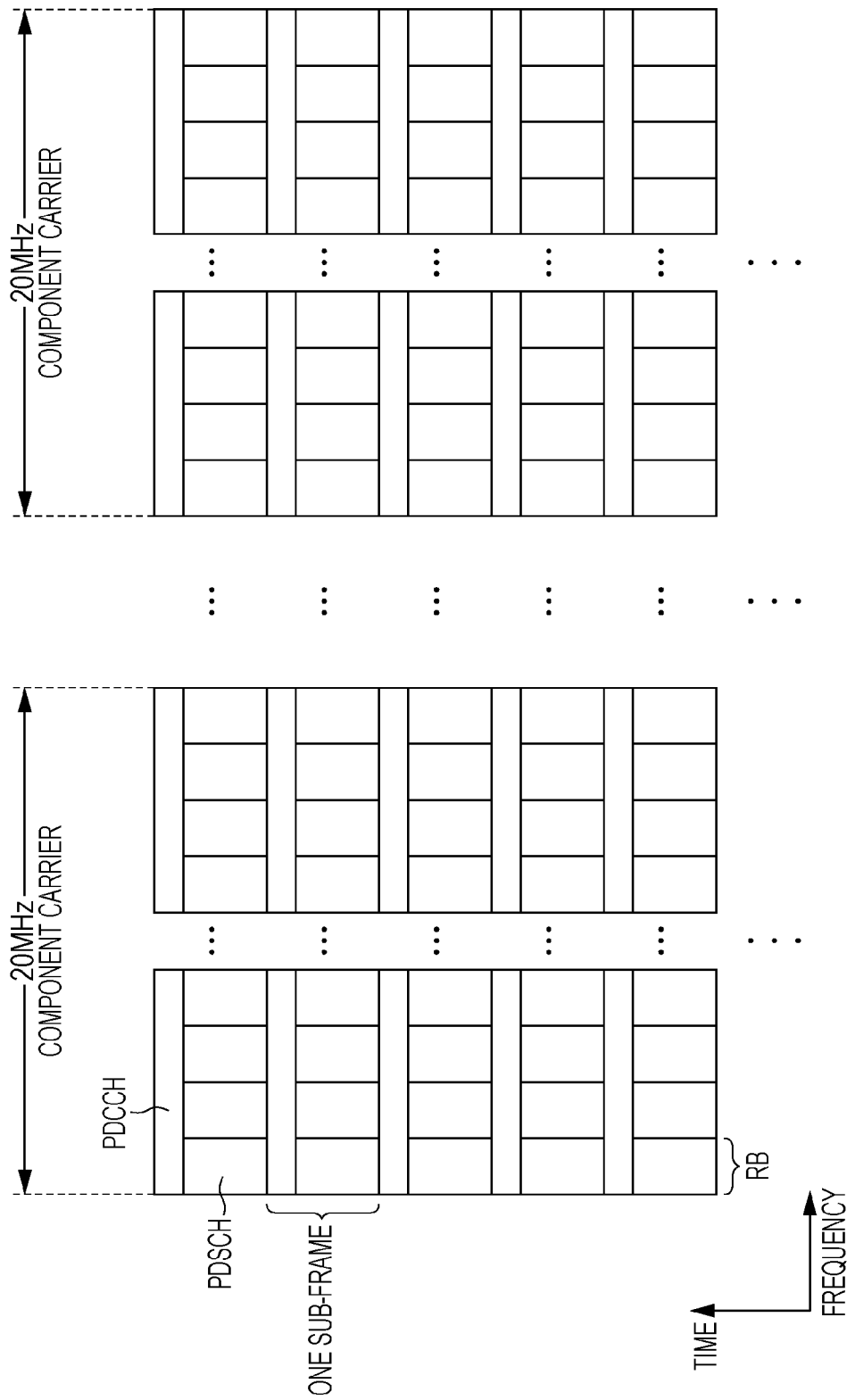
FIG. 11 is a diagram illustrating component carriers of a downlink of Advanced-EUTRA.
Figure 12:
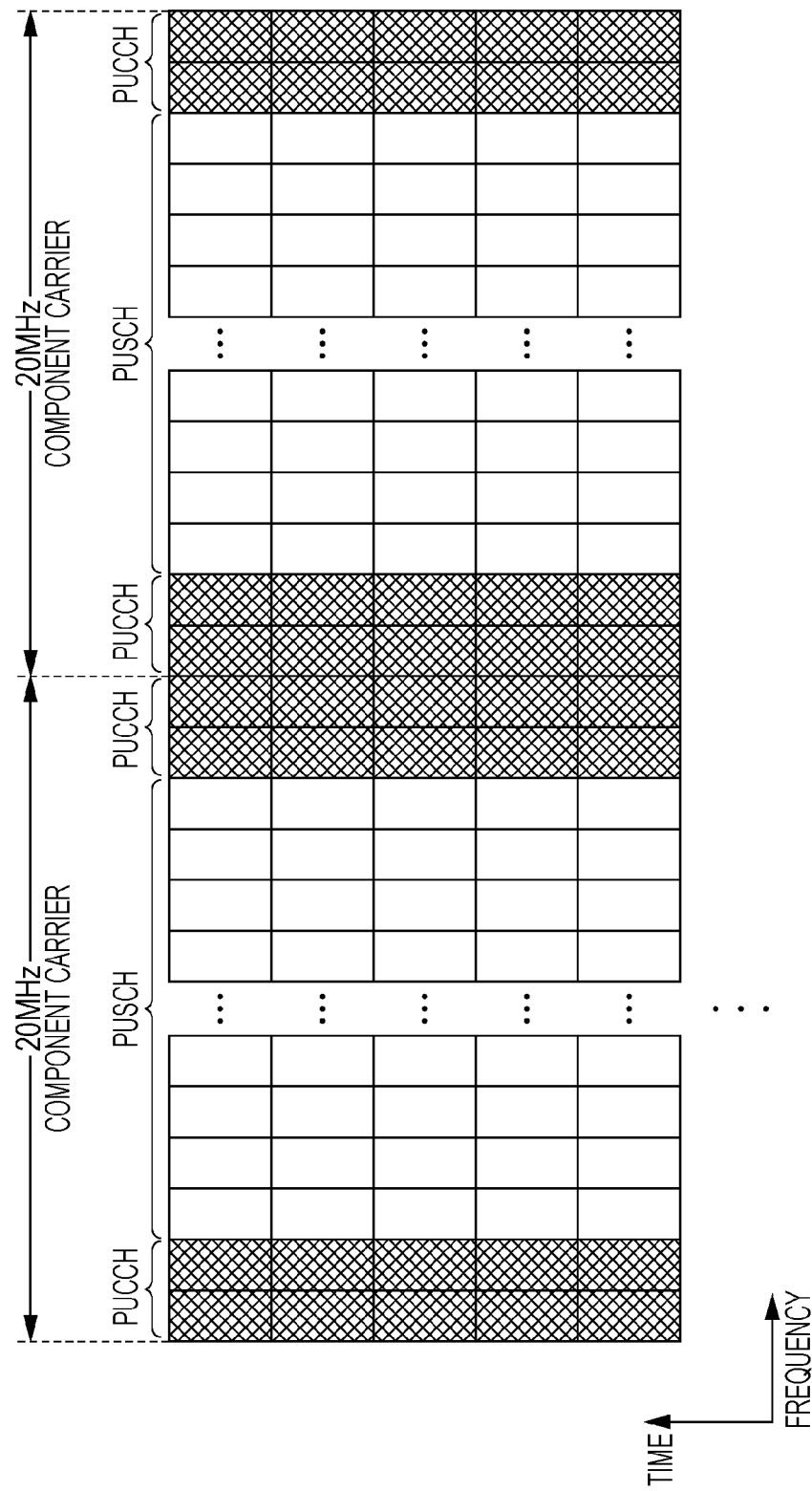
FIG. 12 is a diagram illustrating component carriers of an uplink of the Advanced-EUTRA.

FIG. 11 is a diagram illustrating component carriers in the downlink of the Advanced-EUTRA. FIG. 12 is a diagram illustrating component carriers in the uplink of the Advanced-EUTRA.

In the Advanced-EUTRA, it is planned that a band of a maximum of 100 MHz is realized by grouping a plurality of bands of the EUTRA lower than or equal to 20 MHz so that mobile station apparatuses of the EUTRA can be included. It is to be noted that in the Advanced-EUTRA, a band of the EUTRA lower than or equal to 20 MHz is referred to as a component carrier (CC) (NPL 2). In addition, one cell is configured by combining one component carrier of the downlink and one component carrier of the uplink. It is to be noted that one cell can also be configured only by one component carrier of the downlink.

That is, the base station apparatus is configured to assign a plurality of cells that are suitable of the communication performance and the communication conditions of a mobile station apparatus and communicate with the mobile station apparatus through the plurality of assigned cells. It is to be noted that among the plurality of cells assigned to the mobile station apparatus, one cell is determined as a primary cell and the other cells are determined as secondary cells. Special functions such as assignment of the physical uplink control channel PUCCH and permission of access to the random access channel RACH are set to the primary cell.

In addition, in order to reduce the power consumption of the mobile station apparatus, the mobile station apparatus is configured in such a way as to begin a downlink reception process on a secondary cell instructed to be activated (or follow wireless resource assignment information specified in the physical downlink control channel) after the base station apparatus instructs the secondary cell to be activated without performing the downlink reception process on the secondary cell immediately after the assignment (or without following the wireless resource assignment information specified in the physical downlink control channel). In addition, the mobile station apparatus is configured in such a way as to stop the downlink reception process performed on an activated secondary cell instructed to be deactivated (or not to follow the wireless resource assignment information specified in the physical downlink control channel) after the base station apparatus instructs the secondary cell to be deactivated. It is to be noted that a secondary cell instructed by the base station apparatus to be activated and on which the downlink reception process is being performed is referred to as an "activated cell". In addition, a secondary cell immediately after the assignment from the base station apparatus to the mobile station apparatus and a secondary cell instructed to be deactivated and for which the downlink reception process has been stopped are referred to as "deactivated cells". In addition, the primary cell is always an activated cell.

Figure 13:
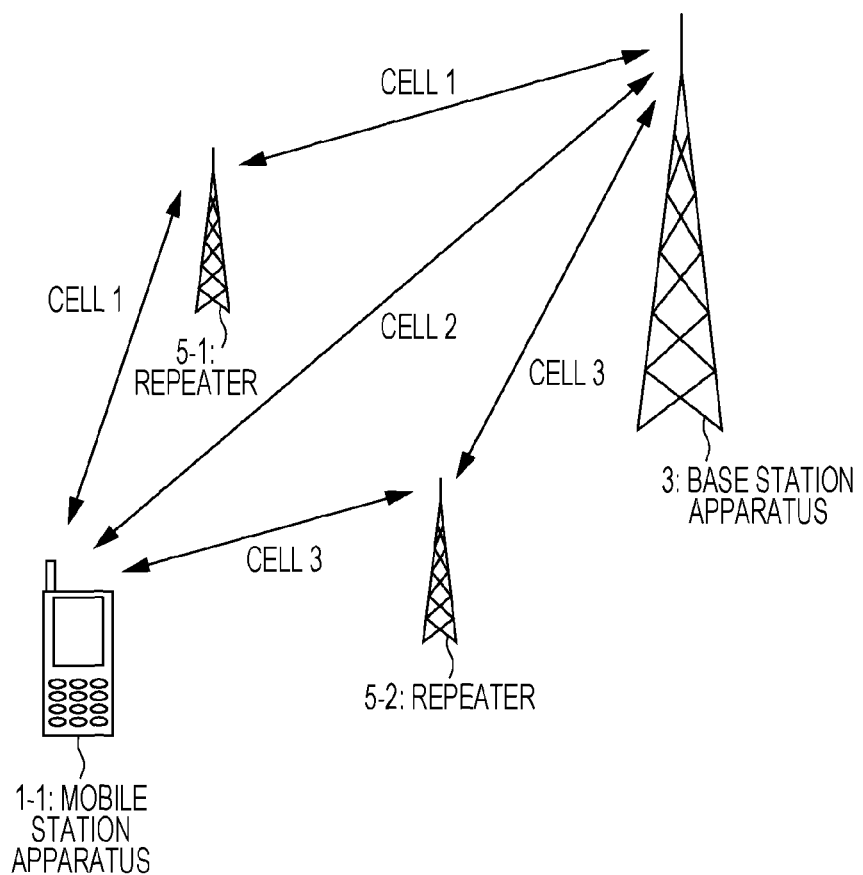
FIG. 13 is a diagram illustrating an example in which a base station apparatus and a mobile station apparatus communicate with each other through repeaters.

When the mobile station apparatus communicates with the base station apparatus using a plurality of cells, however, the mobile station apparatus might connect to the base station apparatus through repeaters or the like as illustrated in FIG. 13. In such a case, both or either of a timing at which the mobile station apparatus receives data from a downlink component carrier and a timing at which the mobile station apparatus transmits data to the base station apparatus through each uplink component carrier become different between the cells. In particular, when the timing at which the mobile station apparatus transmits data to the base station apparatus through each uplink component carrier is different, the mobile station apparatus needs to perform transmission of data to the base station apparatus after adjusting the transmission timing for the uplink component carrier of each cell.

[Description of Configurations]

Figure 1:
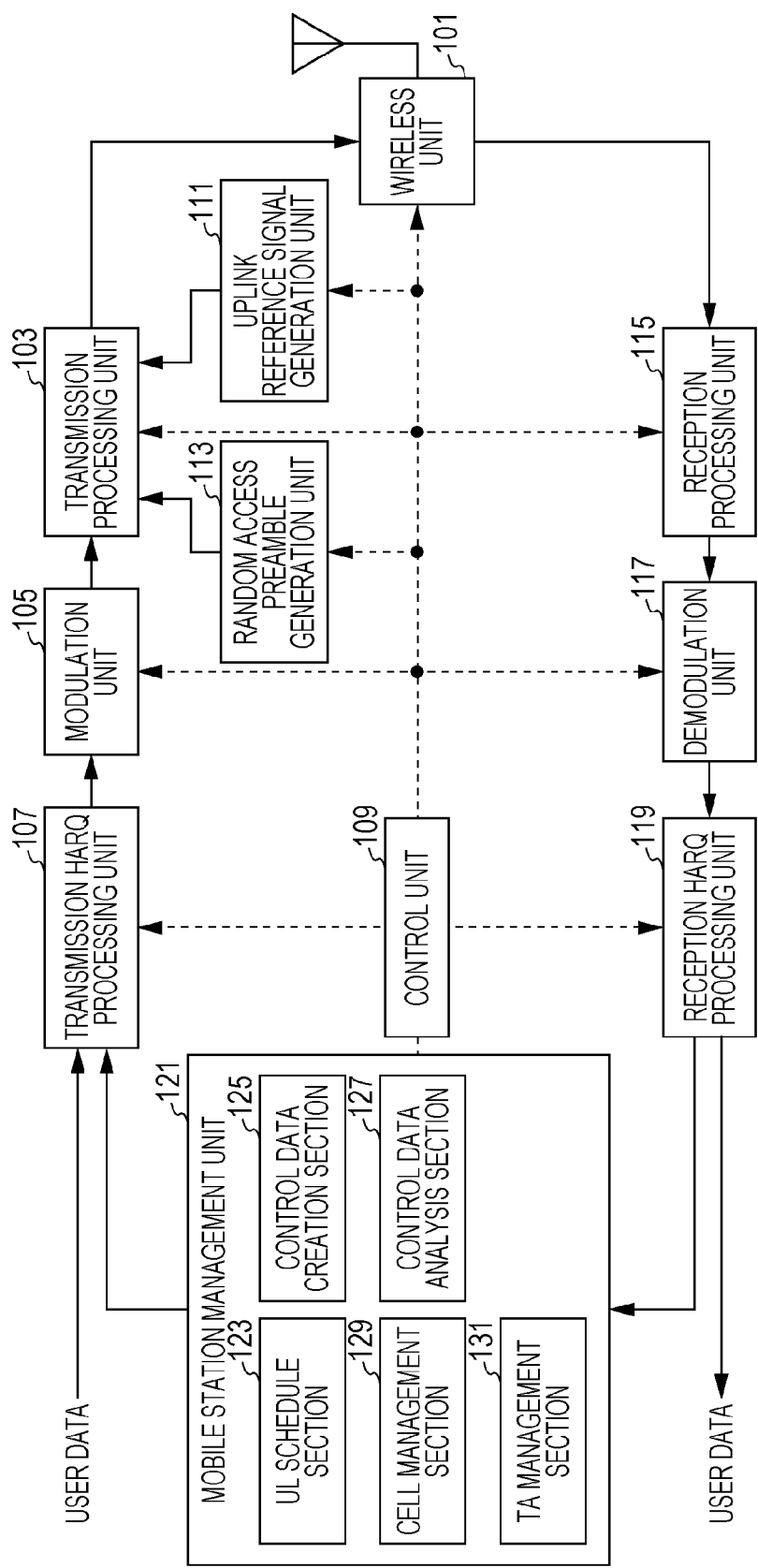
FIG. 1 is a diagram illustrating the configuration of a mobile station apparatus according to an embodiment of the present invention.

FIG. 1 is a diagram illustrating the configuration of a mobile station apparatus according to an embodiment of the present invention. The mobile station apparatuses 1-1 to 1-3 each include a wireless unit 101, a transmission processing unit 103, a modulation unit 105, a transmission HARQ processing unit 107, a control unit 109, an uplink reference signal generation unit 111, a random access preamble generation unit 113, a reception processing unit 115, a demodulation unit 117, a reception HARQ processing unit 119, and a mobile station management unit 121. The mobile station management unit 121 includes a UL schedule section 123, a control data creation section 125, a control data analysis section 127, a cell management section 129, and a TA management section 131.

The user data and the control data are input to the transmission HARQ processing unit 107. The transmission HARQ processing unit 107 encodes the input data and performs a puncture process on the encoded data in accordance with an instruction from the control unit 109. The transmission HARQ processing unit 107 then outputs the punctured data to the modulation unit 105. Furthermore, the transmission HARQ processing unit 107 saves the encoded data. In addition, when the control unit 109 has instructed the transmission HARQ processing unit 107 to retransmit data, the transmission HARQ processing unit 107 performs a puncture process different from the previously performed puncture on the encoded data saved therein. The transmission HARQ processing unit 107 outputs the data subjected to the different puncture process to the modulation unit 105. In addition, the transmission HARQ processing unit 107 deletes the saved data in accordance with an instruction from the control unit 109.

The modulation unit 105 modulates the data input from the transmission HARQ processing unit 107 and outputs the modulated input data to the transmission processing unit 103. The transmission processing unit 103 maps data (or a signal) input from the modulation unit 105, the uplink reference signal generation unit 111, or the random access preamble generation unit 113 in each channel of the uplink component carrier of each cell in accordance with an instruction from the control unit 109. The transmission processing unit 103 generates an OFDM signal by performing OFDM signal processing including various processes such as serial-to-parallel conversion, a DFT-IFFT (inverse fast Fourier transform), and CP insertion on the mapped data. In addition, the transmission processing unit 103 adjusts the transmission timing of a signal to be output for the uplink component carrier of each cell on the basis of transmission timing information and transmission timing group information for adjusting the transmission timing transmitted from the control unit 109. After adjusting the transmission timing, the transmission processing unit 103 outputs the OFDM signal to the wireless unit 101.

The uplink reference signal generation unit 111 generates an uplink reference signal on the basis of uplink reference signal generation information obtained from the mobile station management unit 121 and outputs the generated uplink reference signal to the transmission processing unit 103 in accordance with an instruction from the control unit 109. When only a preamble number has been transmitted from the control unit 109, the random access preamble generation unit 113 generates a random access preamble having the transmitted preamble number on the basis of set random access information. In addition, the random access preamble generation unit 113 selects the position of a random access channel RACH through which the random access preamble is to be transmitted on the basis of the random access information. Furthermore, the random access preamble generation unit 113 outputs the generated random access preamble and the selected position of the random access channel RACH to the transmission processing unit 103. In addition, when a preamble number and the position of a random access channel RACH have been transmitted from the control unit 109, the random access preamble generation unit 113 generates a random access preamble having the transmitted preamble number on the basis of random access information and outputs the generated random access preamble and the transmitted position of the random access channel RACH to the transmission processing unit 103.

The wireless unit 101 up-converts the signal input from the transmission processing unit 103 to a radio frequency and transmits the up-converted signal from a transmission antenna in accordance with an instruction from the control unit 109. In addition, the wireless unit 101 down-converts a wireless signal received from the antenna and outputs the down-converted signal to the reception processing unit 115. The reception processing unit 115 performs an FFT (fast Fourier transform) process on the signal input from the wireless unit 101 and outputs the signal subjected to the FFT process to the demodulation unit 117. The demodulation unit 117 performs a process for demodulating the input data and outputs the demodulated data to the reception HARQ processing unit 119.

The reception HARQ processing unit 119 performs a process for decoding the input data. If the decoding process has been successful, the reception HARQ processing unit 119 outputs control data to the mobile station management unit 121 and user data to a higher layer. If the process for decoding the input data has failed, the reception HARQ processing unit 119 saves the data for which the decoding process has failed. When retransmitted data has been received, the reception HARQ processing unit 119 combines the saved data with the retransmitted data and performs the decoding process on the data obtained as a result of the combining. In addition, the reception HARQ processing unit 119 transmits a result of the process for decoding the input data to the mobile station management unit 121. In addition, the reception HARQ processing unit 119 deletes the saved data in accordance with an instruction from the control unit 109.

The control unit 109 controls the wireless unit 101, the transmission processing unit 103, the modulation unit 105, the transmission HARQ processing unit 107, the uplink reference signal generation unit 111, the random access preamble generation unit 113, the reception processing unit 115, the demodulation unit 117, and the reception HARQ processing unit 119 on the basis of instructions from the mobile station management unit 121.

The mobile station management unit 121 includes the UL schedule section 123, the control data creation section 125, the control data analysis section 127, the cell management section 129, and the TA management section 131. The control data creation section 125 creates, on the basis of the result of the decoding included in data received from the reception HARQ processing unit 119, control data such as an ACK/NACK message for the data and a message indicating the wireless quality of the downlink. The control data creation section 125 outputs the created control data to the transmission HARQ processing unit 107. The control data analysis section 127 analyzes the control data input from the reception HARQ processing unit 119. The control data analysis section 127 outputs system information regarding cells (or setting information regarding cells), assignment information regarding the cells, random access specification information, a random access response message, a contention resolution message, and generation information regarding an uplink reference signal received from the base station apparatus 3 to the cell management section 129. The control data analysis section 127 outputs a transmission timing message and transmission timing timer information to the TA management section 131.

The UL schedule section 123 controls the transmission processing unit 103, the modulation unit 105, and the transmission HARQ processing unit 107 through the control unit 109 on the basis of scheduling information regarding uplink data and a response (ACK/NACK) to transmitted uplink data from the base station apparatus 3. In addition, the UL schedule section 123 instructs the cell management section 129 to begin the random access procedure on the basis of control information from a higher layer.

The cell management section 129 manages cells assigned from the base station apparatus 3. The cell management section 129 manages system information or setting information (system information regarding each cell such as the configuration of physical channels, transmission power information, random access information, and generation information regarding an uplink reference signal and wireless resources individually assigned to the mobile station apparatus 1-1, such as a wireless resource for the uplink reference signal (sounding reference signal) and a wireless resource for the physical uplink control channel PUCCH) regarding each cell received from the base station apparatus 3. The cell management section 129 transmits the random access information to the random access preamble generation unit 113 through the control unit 109. The cell management section 129 transmits the generation information regarding an uplink reference signal to the uplink reference signal generation unit 111 through the control unit 109.

The cell management section 129 transmits group information regarding cells whose transmission timings are the same to the TA management section 131. At the time of the beginning of communication or when an uplink data schedule request is to be issued, the cell management section 129 begins the contention based random access procedure. In the contention based random access procedure, the cell management section 129 selects a random preamble on the basis of the random access information, and transmits a preamble number of the selected random preamble to the random access preamble generation unit 113 through the control unit 109. In addition, when random access specification information has been obtained, the cell management section 129 begins the non-contention based random access procedure. More specifically, in the non-contention based random access procedure, the cell management section 129 transmits a preamble number and a random access channel number included in the random access specification information to the random access preamble generation unit 113 through the control unit 109.

When a random access response message has been obtained, the cell management section 129 (i) outputs transmission timing information included in the random access response message to the TA management section 131, (ii) outputs information regarding an L2/L3 message to the control data creation section 125, and (iii) when the non-contention based random access procedure is being executed, ends the non-contention based random access procedure. When a contention resolution message has been obtained, the cell management section 129 ends the contention based random access procedure.

The TA management section 131 manages a transmission timing and a transmission timing timer for each cell or each transmission timing group. In addition, the TA management section 131 also manages the group information regarding cells whose transmission timings are the same. When a transmission timing message has been obtained, the TA management section 131 transmits, to the transmission processing unit 103 through the control unit 109, transmission timing group information to which a transmission timing included in the transmission timing message is applied and transmission timing information, and starts or restarts a transmission timing timer of a transmission timing group to which the transmission timing is applied.

Figure 2:
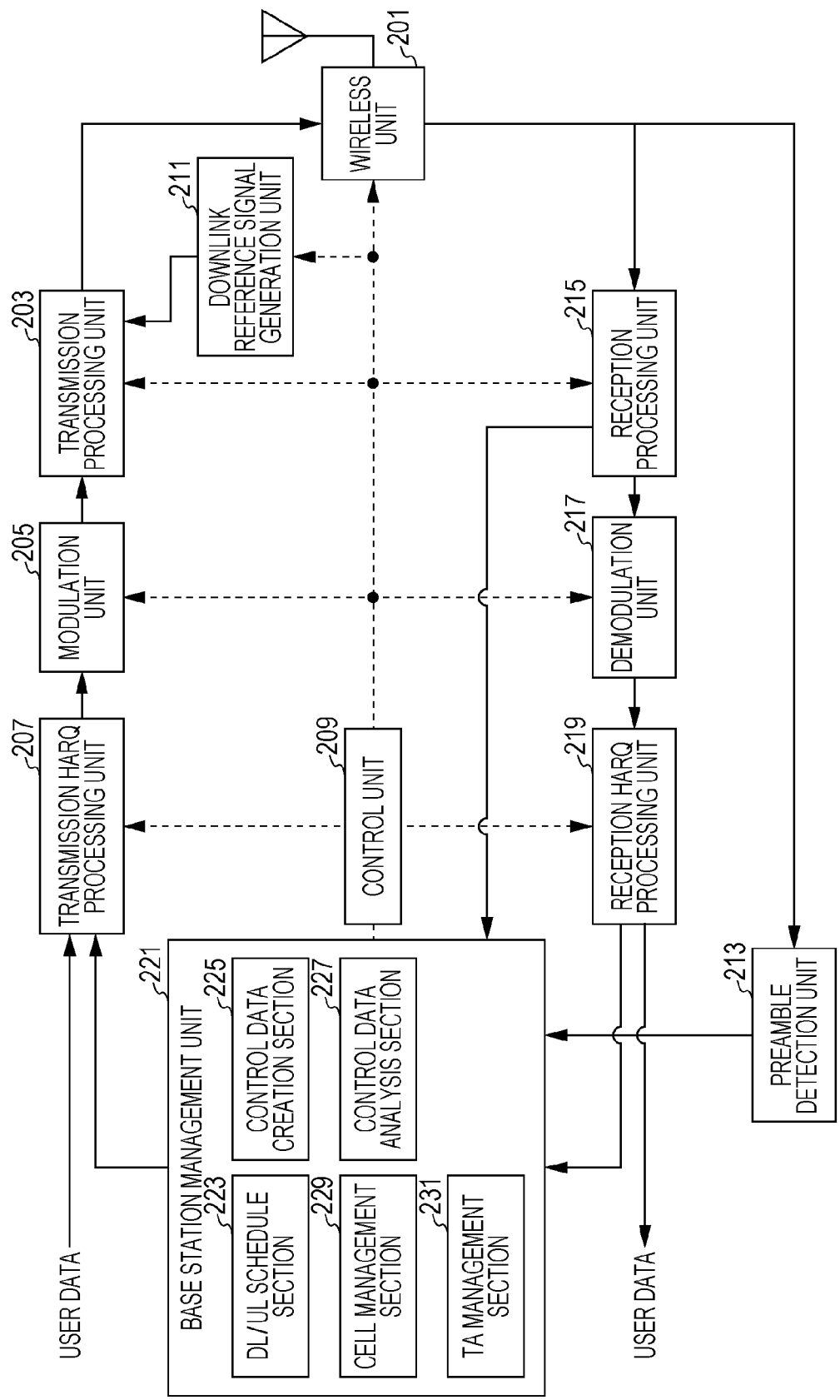
FIG. 2 is a diagram illustrating the configuration of a base station apparatus according to the embodiment of the present invention.

FIG. 2 is a diagram illustrating the configuration of the base station apparatus 3 according to the embodiment of the present invention. The base station apparatus 3 includes a wireless unit 201, a transmission processing unit 203, a modulation unit 205, a transmission HARQ processing unit 207, a control unit 209, a downlink reference signal generation unit 211, a preamble detection unit 213, a reception processing unit 215, a demodulation unit 217, a reception HARQ processing unit 219, and a base station management unit 221. The base station management unit 221 includes a DL/UL schedule section 223, a control data creation section 225, a control data analysis section 227, a cell management section 229, and a TA management section 231.

The user data and the control data are input to the transmission HARQ processing unit 207. The transmission HARQ processing unit 207 encodes the input data and performs a puncture process on the encoded data in accordance with an instruction from the control unit 209. The transmission HARQ processing unit 207 then outputs the punctured data to the modulation unit 205. Furthermore, the transmission HARQ processing unit 207 saves the encoded data. When the transmission HARQ processing unit 207 has been instructed by the control unit 209 to retransmit data, the transmission HARQ processing unit 207 obtains the encoded data saved therein and performs a puncture process different from the previously performed puncture. The transmission HARQ processing unit 207 outputs the data subjected to the different puncture process to the modulation unit 205. The transmission HARQ processing unit 207 deletes the saved data in accordance with an instruction from the control unit 209.

The modulation unit 205 modulates the data input from the transmission HARQ processing unit 207 and outputs the modulated input data to the transmission processing unit 203. The transmission processing unit 203 maps data (or signals) input from the modulation unit 205 and the downlink reference signal generation unit 211 in the channels of the downlink component carrier of each cell, such as the physical downlink control channel PDCCH, the downlink synchronization channel DSCH, the physical broadcast channel PBCH, and the physical downlink shared channel PDSCH. The transmission processing unit 203 generates an OFDM signal by performing OFDM signal processing including various processes such as serial-to-parallel conversion, an IFFT (inverse fast Fourier transform), and CP insertion on the mapped data. The transmission processing unit 203 then outputs the generated OFDM signal to the wireless unit 201.

The wireless unit 201 up-converts the signal input from the transmission processing unit 203 to a radio frequency and transmits the up-converted signal to the mobile station apparatuses 1-1 to 1-3 from a transmission antenna in accordance with an instruction from the control unit 209. In addition, the wireless unit 201 receives a wireless signal from the wireless unit 101 from the antenna and down-converts the received signal to a baseband signal. The wireless unit 201 outputs the down-converted signal to the reception processing unit 215 or the preamble detection unit 213. The reception processing unit 215 performs an FFT (fast Fourier transform) process on the signal input from the wireless unit 201 and outputs the signal subjected to the FFT process to the demodulation unit 217. In addition, the reception processing unit 215 measures the wireless transmission path quality and the amount of deviation in the transmission timing on the basis of an uplink reference signal (sounding reference signal). The reception processing unit 215 transmits a result of the measurement to the base station management unit 221. It is to be noted that an uplink communication method is assumed to be a single-carrier method such as DFT-spread OFDM, but a multi-carrier method such as an OFDM method may be used, instead. The demodulation unit 217 performs a process for demodulating the input data, and outputs the demodulated data to the reception HARQ processing unit 219.

The reception HARQ processing unit 219 performs a process for decoding the input data. If the decoding process has been successful, the reception HARQ processing unit 219 outputs control data to the base station management unit 221 and also outputs user data to a higher layer. If the process for decoding the input data has failed, the reception HARQ processing unit 219 saves the data for which the decoding process has failed. When retransmitted data has been received, the reception HARQ processing unit 219 combines the retransmitted data with the saved data, and performs the decoding process on data obtained as a result of the combining. In addition, the reception HARQ processing unit 219 transmits a result of the process for decoding the input data to the base station management unit 221. In addition, the reception HARQ processing unit 219 deletes the saved data in accordance with an instruction from the control unit 209.

The preamble detection unit 213 performs a process for detecting a random access preamble by performing a correlation process on the signal input from the wireless unit 201. When a random access preamble has been detected, the preamble detection unit 213 calculates the amount of deviation in the transmission timing on the basis of the detected random access preamble. The preamble detection unit 213 transmits information regarding a cell in which the random access preamble has been detected and the detected preamble and the amount of deviation in the transmission timing to the base station management unit 221. The control unit 209 controls the wireless unit 201, the transmission processing unit 203, the modulation unit 205, the transmission HARQ processing unit 207, the downlink reference signal generation unit 211, the reception processing unit 215, the demodulation unit 217, and the reception HARQ processing unit 219 on the basis of instructions from the base station management unit 221.

The base station management unit 221 includes the DL/UL schedule section 223 that schedules the downlink and the uplink, the control data creation section 225, the control data analysis section 227, the cell management section 229, and the TA management section 231. The DL/UL schedule section 223 performs scheduling for mapping the user data and the control data in each channel of the downlink on the basis of information regarding the wireless transmission path quality of the downlink transmitted from the mobile station apparatus 1-1, data information regarding each user transmitted from an upper layer, and control data created by the control data creation section 225. The DL/UL schedule section 223 outputs a result of the scheduling to the control unit 209. In addition, the DL/UL schedule section 223 performs scheduling for mapping the user data in each channel of the uplink on the basis of a result of the wireless transmission path quality of the uplink from the reception processing unit 215 and a wireless resource assignment request from the mobile station apparatus 1-1.

In addition, when the DL/UL schedule section 223 has been notified from the preamble detection unit 213 that a random access preamble has been detected, the DL/UL schedule section 223 assigns the physical uplink shared channel PUSCH and transmits the assigned physical uplink shared channel PUSCH and a preamble number to the control data creation section 225. When transmission timing information and transmission timing group information to which the transmission timing is applied have been transmitted from the TA management section 231, the DL/UL schedule section 223 reports, to the TA management section 231, transmission of the transmission timing information and transmits, to the control data creation section 225, the transmission timing information and the transmission timing group information to which the transmission timing is applied. In addition, when user data of the downlink has been generated in a mobile station apparatus for which synchronization of the uplink has not been established, the DL/UL schedule section 223 instructs the cell management section 229 to cause the mobile station apparatus to perform the random access procedure.

The control data creation section 225 creates control data disposed in the physical downlink control channel PDCCH and control data disposed in the physical downlink shared channel PDSCH. The control data creation section 225 creates control data such as a control message including schedule information, a system information message including a response (ACK/NACK) to uplink data, information regarding the configuration of physical channels, transmission power information regarding each channel, and random access information, an initial setting message including setting information (includes the random access information) regarding cells to be used, a random access response message including a preamble number, transmission timing information, and scheduling information, a contention resolution message, and a transmission timing message including random access specification information including a preamble number and the number of a random access channel RACH and transmission timing information. The control data analysis section 227 controls the transmission HARQ processing unit 207 through the control unit 209 in accordance with a result of a response (ACK/NACK) to downlink data from the mobile station apparatus 1-1.

The cell management section 229 manages each cell and system information (information regarding the configuration of physical channels, transmission power information regarding each channel, random access information, cell-related information regarding the transmission timing, and the like) regarding each cell. In addition, the cell management section 229 assigns one or more cells to the mobile station apparatuses 1-1 to 1-3. In addition, the cell management section 229 assigns a wireless resource for the uplink reference signal (sounding reference signal) and a wireless resource for the physical uplink control channel PUCCH. The cell management section 229 then outputs, to the control data creation section 225, assignment information regarding cells, system information regarding cells (setting information regarding cells), and information regarding wireless resources to be assigned to the mobile station apparatuses 1-1 to 1-3, in order to transmit information regarding the assigned cells.

When an instruction to cause a mobile station apparatus to execute the random access procedure has been received from the DL/UL schedule section 223, the cell management section 229 selects a preamble number and the number of a random access channel RACH on the basis of the random access information regarding cells, and transmits the selected numbers to the control data creation section 225.

The TA management section 231 manages a transmission timing and a transmission timing timer of each cell of the mobile station apparatuses 1-1 to 1-3. In addition, the TA management section 231 also manages information related to cells whose transmission timings are the same. When the amount of deviation in the transmission timing has been received from the preamble detection unit 213 or the reception processing unit 215, the TA management section 231 creates transmission timing information and transmission timing group information to which the transmission timing is applied. The TA management section 231 transmits, to the DL/UL schedule section 223, the transmission timing information and the transmission timing group information to which the transmission timing is applied. When the TA management section 231 has been notified of transmission of the transmission timing information from the DL/UL schedule section 223, the TA management section 231 starts or restarts the transmission timing timer.

[Description of Operations]

In the following description, a wireless communication system is assumed in which the base station apparatus described with reference to FIG. 11 and FIG. 12 assigns a plurality of cells to the mobile station apparatus and the base station apparatus and the mobile station apparatus communicate with each other through the plurality of assigned cells. In addition, in the following description, a wireless communication system is assumed in which communication is performed through a plurality of cells whose transmission timings from the mobile station apparatus described with reference to FIG. 13 are different.

In the Advanced-EUTRA, the base station apparatus assigns, from among a plurality of cells, one or more cells whose frequencies are different and that are suitable for the communication performance and the communication conditions of the mobile station apparatus. The mobile station apparatus then transmits and receives data to and from the base station apparatus through the assigned cells. When the mobile station apparatus communicates with the base station apparatus using a plurality of cells, the mobile station apparatus might connect to the base station apparatus through repeaters or the like as illustrated in FIG. 13. In such a case, the timing at which the mobile station apparatus receives data from a downlink component carrier might be different between the cells. Furthermore, the timing at which data is transmitted to the base station apparatus might be different between the uplink component carriers of the cells. When the timing at which data is transmitted to the base station apparatus is different between the uplink component carriers, the mobile station apparatus needs to adjust the transmission timing for the uplink component carrier of each cell.

Therefore, the mobile station apparatus needs to obtain transmission timing information by executing the random access procedure for the uplink component carrier of each cell. When the random access procedure is executed for all the uplink component carriers, however, a burden is placed on the mobile station apparatus.

The base station apparatus arranges cells whose transmission timings from the mobile station apparatus are the same as a group (hereinafter referred to as a "transmission timing group"). The base station apparatus then sets a cell as a primary cell and the other cells as secondary cells. The base station apparatus permits the mobile station apparatus to execute the random access procedure on one cell in each transmission timing group. In the primary cell, the contention based random access procedure and the non-contention based random access procedure are permitted. In the secondary cells, the non-contention based random access procedure is permitted. At this time, even when not all parameters (that is, setting information necessary to execute the contention based random access procedure and the non-contention based random access procedure) of the random access information are transmitted to the mobile station apparatus as information regarding the primary cell, the base station apparatus transmits setting information including the parameters to the mobile station apparatus as "setting information to be held". When, in the random access information, not only parameters of the random access information necessary for the non-contention based random access procedure are transmitted to the mobile station apparatus as information regarding the secondary cells for permitting the non-contention based random access procedure, the base station apparatus transmits setting information including the parameters to the mobile station apparatus as "setting information to be released (discarded)". In the following description, parameters of the random access information necessary for each random access procedure may be simply referred to as "random access information".

The "setting information to be held" indicates setting information for which, when changes are made to cells for which random access information has been set but the changes are not explicitly transmitted to the parameters of the random access information, values of the parameters that have already been set are held are continuously used after the changes. On the other hand, the "setting information to be released (discarded)" indicates setting information for which, when changes are made to cells for which random access information has been set but changes are not explicitly transmitted to the parameters of the random access information, values of the parameters that have already been set are released and not used after the changes and functions relating to the released parameters need to be stopped.

In doing so, it becomes possible for the base station apparatus to limit cells for which the mobile station apparatus can begin the random access procedure. In addition, even if the mobile station apparatus tries to execute the contention based random access procedure for cells to which only random access information for the non-contention based random access procedure has been transmitted, there is no information necessary for the contention based random access procedure. Therefore, the mobile station apparatus cannot execute the contention based random access procedure.

In addition, important functions are set to the primary cell by, for example, assigning regular wireless resources for transmitting telephone and real-time information, the physical uplink control channel PUCCH used for responding to the physical downlink shared channel PDSCH, and the physical uplink control channel PUCCH for transmitting control information such as the information regarding the wireless transmission path quality of the downlink. Therefore, a cell whose communication environment is desirable, such as a cell whose wireless transmission path state is desirable, is set as the primary cell.

The mobile station apparatus recognizes a cell to which the random access information has been transmitted as a cell for which the random access procedure is permitted to be performed. In addition, the mobile station apparatus recognizes a cell to which all the parameters of the random access information have been transmitted as a cell for which the contention based random access procedure and the non-contention based random access procedure are permitted to be performed. Furthermore, the mobile station apparatus recognizes a cell to which part of the parameters of the random access information have been transmitted as a cell for which the non-contention based random access procedure is permitted to be performed. In doing so, it becomes possible for the mobile station apparatus to recognize whether or not the random access procedure is permitted in each cell on the basis of whether or not the random access information has been transmitted. In addition, when only the non-contention based random access procedure is permitted, the base station apparatus can reduce the amount of data of the random access information to be transmitted without using excessive wireless resources.

In addition, transmission timing groups are classified into (i) first transmission timing groups, each including a primary cell and secondary cells whose uplink transmission timings are the same as that of the primary cell, and (ii) second transmission timing groups, each including secondary cells having the same uplink transmission timing that is different from the uplink transmission timing of the primary cell. Each first transmission timing group at least includes a primary cell. Each second transmission timing group includes at least one secondary cell.

In addition, the random access information includes a plurality of parameters such as (i) random access channel setting information including information regarding a CAZAC sequence number used for generating a random access preamble and arrangement information regarding the random access channel RACH, (ii) random preamble setting information including information for selecting and generating a random preamble, such as the number of random preambles and group information regarding the random preambles, and (iii) random access procedure-related information including random access preamble transmission power information, setting information regarding a maximum number of random access preambles transmitted, information relating to reception of a random access response, information relating to reception of a contention resolution, and information relating to transmission of an L2/L3 message. Information necessary for the contention based random access procedure is all the parameters of the above-described random access information. Information necessary for the non-contention based random access procedure is, in the above-described random access information, the parameters of the random access channel setting information, the random access preamble transmission power information, the setting information regarding a maximum number of random access preambles transmitted, and the information relating to reception of a random access response. It is to be noted that the base station apparatus 3 may set, independently for each cell, the setting values of the random access information to be set for the primary cell and the secondary cells.

Figure 3:
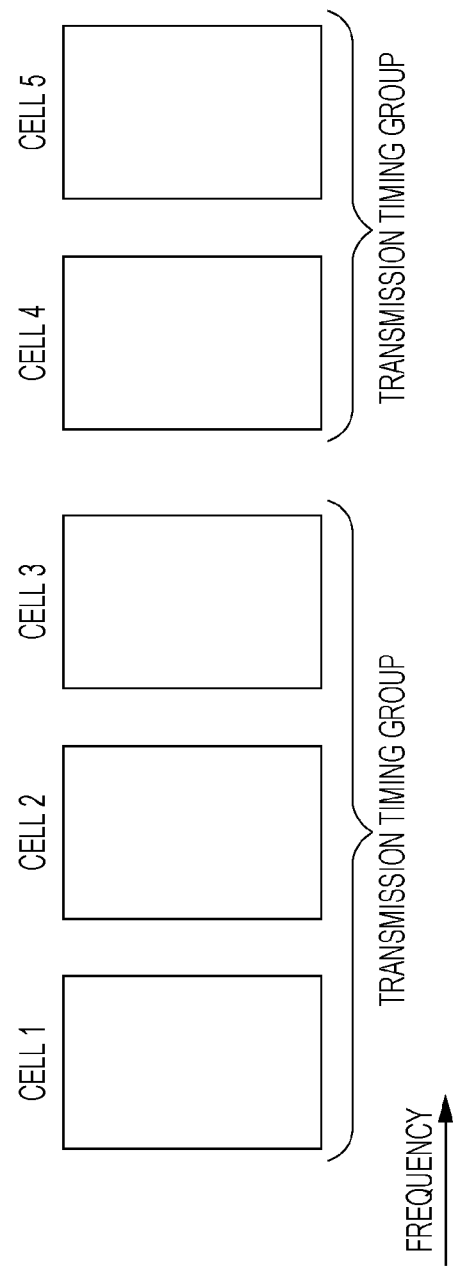
FIG. 3 is a diagram illustrating an example of the configuration of cells according to the embodiment of the present invention.

The operations of the mobile station apparatus 1-1 and the base station apparatus 3 will be described. It is to be noted that, for example, the base station apparatus 3 is assumed to include Cell 1 to Cell 5 as illustrated in FIG. 3. It is assumed that Cell 1 to Cell 3 belong to the same transmission timing group (Transmission Timing Group 1) whose transmission timing is the same. It is assumed that Cell 4 and Cell 5 have the same transmission timing and belong to a transmission timing group (Transmission Timing Group 2) different from Transmission Timing Group 1.

The mobile station apparatus 1-1 searches for cells and finds one of the cells of the base station apparatus 3. Here, it is assumed that the mobile station apparatus 1-1 finds Cell 1. The mobile station apparatus 1-1 receives the physical broadcast channel PBCH of Cell 1 or the like, and obtains system information (physical channel configuration, transmission power information, and random access information regarding the cell and the like) regarding Cell 1. The mobile station apparatus 1-1 then (i) selects and generates a random access preamble using random access information included in the system information for initial access, (ii) selects a random access channel RACH to which the random access preamble is to be transmitted, and (iii) transmits the random access preamble (Message 1) to the random access channel RACH of Cell 1, which has been selected.

Next, the mobile station apparatus 1-1 obtains a random access response message (Message 2) including transmission timing information for Cell 1 from the base station apparatus 3. The mobile station apparatus 1-1 adjusts the transmission timing of an uplink component carrier of Cell 1 on the basis of the transmission timing information included in the random access response. After the adjustment, the mobile station apparatus 1-1 starts a transmission timing timer. The mobile station apparatus 1-1 transmits an L2/L3 message (Message 3) to the base station apparatus 3 through Cell 1. It is to be noted that the mobile station apparatus 1-1 transmits Message 3 while including content indicating the initial access in Message 3. Next, upon receiving a contention resolution (Message 4) from the base station apparatus 3, the mobile station apparatus 1-1 ends the contention based random access procedure.

Figure 4:
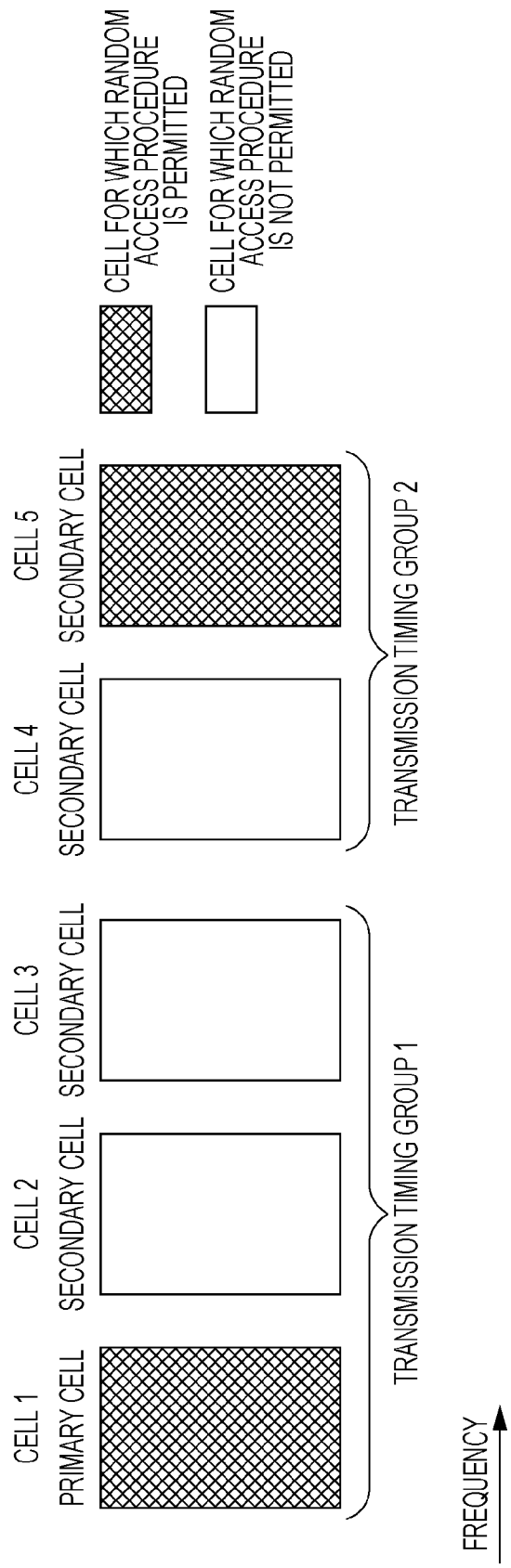
FIG. 4 is a diagram illustrating an example of assignment of the cells according to the embodiment of the present invention.

After the completion of the random access procedure, the base station apparatus 3 assigns cells to be used by the mobile station apparatus 1-1, and transmits assignment information to the mobile station apparatus 1-1. It is to be noted that, here, the base station apparatus 3 assigns Cell 1 to Cell 5 to the mobile station apparatus 1-1 as illustrated in FIG. 4. The base station apparatus 3 sets Cell 1 as a primary cell and Cell 2 to Cell 5 as secondary cells. The base station apparatus 3 sets Cell 1 to Cell 3 to a transmission timing group (Transmission Timing Group 1) whose transmission timing is the same. The base station apparatus 3 sets Cell 4 and Cell 5 to a transmission timing group (Transmission Timing Group 2) whose transmission timing is the same. In addition, the base station apparatus 3 sets (permits) the non-contention based random access procedure for Cell 5 in Transmission Timing Group 2.

Next, the base station apparatus 3 transmits, to the mobile station apparatus 1-1, setting information set for each mobile station apparatus, such as (i) setting information (system information regarding each cell) regarding the cells (Cell 1 to Cell 5) assigned to the mobile station apparatus 1-1 and group information regarding the transmission timing groups, (ii) assignment information regarding the physical uplink control channel PUCCH of the primary cell, (iii) generation information regarding an uplink reference signal (sounding reference signal) and wireless resource assignment information for transmitting the uplink reference signal (sounding reference signal), and (iv) information regarding regular assignment of physical downlink shared channels PDSCH. In addition, the base station apparatus 3 transmits, to the mobile station apparatus 1-1, random access information while including the random access information in the setting information regarding the cells as information regarding cells for which the random access procedure is permitted. It is to be noted that since Cell 1 has been set as the primary cell here, the base station apparatus 3 transmits all the parameters of the random access information to Cell 1 and part of the parameters of the random access information necessary for the non-contention based random access procedure to Cell 5. The mobile station apparatus 1-1 recognizes, for each cell that has obtained the random access information, the random access procedure permitted in each cell on the basis of the set parameters.

It is to be noted that since the mobile station apparatus 1-1 has already obtained the random access information for Cell 1 in the initial access, the base station apparatus 3 need not transmit the random access information for Cell 1 to the mobile station apparatus 1-1 again. When the base station apparatus 3 sets the primary cell to a cell different from one in the initial access, the base station apparatus 3 invariably transmits the random access information. It is to be noted that after transmitting the above-described information, the base station apparatus 3 instructs the mobile station apparatus 1-1 to activate Cell 2 to Cell 5, and the mobile station apparatus 1-1 begins to perform a downlink reception process on Cell 2 to Cell 5.

Next, after obtaining the setting information regarding the assigned cells and the group information regarding the transmission timing groups, the mobile station apparatus 1-1 adjusts the transmission timings of the uplink of Cell 2 and Cell 3, which belong to the same transmission timing group as Cell 1, on the basis of the group information regarding the transmission timing groups and the obtained transmission timing information regarding Cell 1. Thereafter, the mobile station apparatus 1-1 and the base station apparatus 3 communicate data through downlink component carriers of Cell 1 to Cell 5 and uplink component carriers of Cell 1 to Cell 3.

If the amount of data transmitted from the mobile station apparatus 1-1 becomes large and there is a cell that is not used by the mobile station apparatus 1-1, the base station apparatus 3 transmits random access specification information for instructing the mobile station apparatus 1-1 to perform the non-contention based random access procedure through the physical downlink control channel PDCCH. Here, it is assumed that the base station apparatus 3 transmits random access specification information for Cell 5 to the mobile station apparatus 1-1. The random access specification information includes a preamble number and a random access channel number. The mobile station apparatus 1-1 generates a random access preamble on the basis of the preamble number specified by the base station apparatus 3 and the random access information included in the held setting information regarding Cell 5. The mobile station apparatus 1-1 selects a random access channel RACH to which the random access preamble is to be transmitted. The mobile station apparatus 1-1 transmits the random access preamble to the random access channel RACH of Cell 5.

Upon detecting the random access preamble, the base station apparatus 3 calculates the amount of deviation in the transmission timing from the random access preamble. The base station apparatus 3 transmits a random access response including transmission timing information to the mobile station apparatus 1-1 through the downlink component carrier of Cell 5. Upon receiving the random access response, the mobile station apparatus 1-1 adjusts the transmission timing information included in the random access response as the transmission timing of the uplink of Cell 5. Furthermore, the mobile station apparatus 1-1 adjusts the transmission timing information as the transmission timing of the uplink of Cell 4, which belongs to the same transmission timing group. When the transmission timing timer has not been started, the mobile station apparatus 1-1 starts the transmission timing timer. The mobile station apparatus 1-1 then completes the non-contention based random access procedure. Thereafter, the mobile station apparatus 1-1 and the base station apparatus 3 communicate data also using uplink components carriers of Cell 4 and Cell 5.

The mobile station apparatus 1-1 includes one transmission timing timer for each transmission timing group, and upon obtaining transmission timing information, starts or restarts the transmission timing timer. The base station apparatus 3 also includes one transmission timing timer for each transmission timing group, and upon transmitting transmission timing information, starts or restarts the transmission timing timer. While the transmission timing timer is operating, uplink synchronization is established (transmission timing is valid) in the corresponding transmission timing group, and accordingly the mobile station apparatus 1-1 may perform uplink transmission using the uplink component carriers in the corresponding transmission timing group. Alternatively, the transmission timing timer may be included in each cell.

Figure 5:
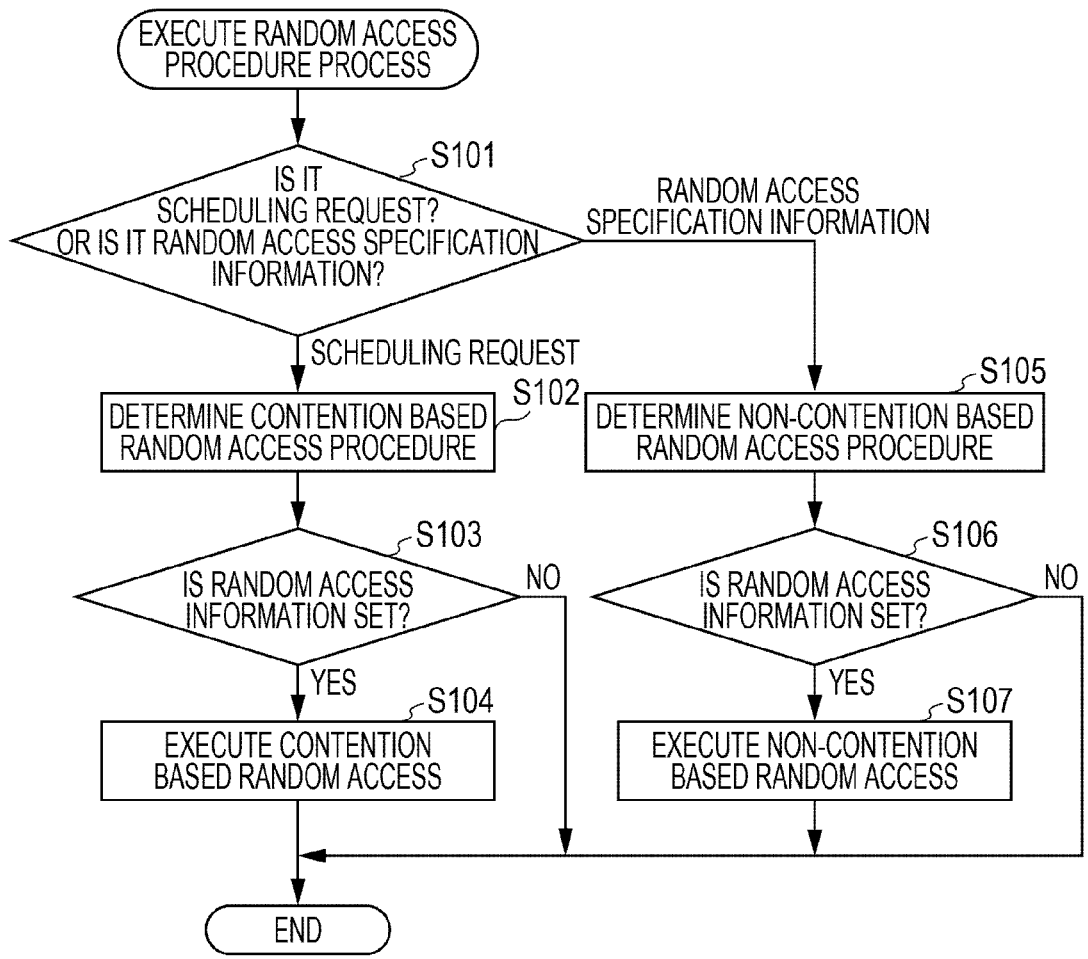
FIG. 5 is a flowchart illustrating an example of the operation of the mobile station apparatus at a time when a transmission timing message has been received.

The operation of the mobile station apparatus 1-1 will be described hereinafter with reference to a flowchart of FIG. 5.

The mobile station apparatus 1-1 is assigned a plurality of cells by the base station apparatus 3. The mobile station apparatus 1-1 receives setting information regarding each cell and sets the setting information regarding each cell. When the mobile station apparatus 1-1 is to execute the random access procedure on the basis of a scheduling request or random access specification information from the base station apparatus 3, the mobile station apparatus 1-1 checks for what reason the random access procedure is executed (step S101). If the random access procedure is executed because of a scheduling request, the mobile station apparatus 1-1 determines to execute the contention based random access procedure in the primary cell (step S102). The mobile station apparatus 1-1 checks whether or not random access information is set in setting information regarding the primary cell (step S103).

If random access information is set in the setting information regarding the primary cell, the mobile station apparatus 1-1 executes the contention based random access procedure (step S104). If random access information is not set in the setting information regarding the primary cell, the mobile station apparatus 1-1 does not execute the contention based random access procedure. If the random access procedure is executed because of random access specification information, the mobile station apparatus 1-1 determines to execute the non-contention based random access procedure. The mobile station apparatus 1-1 checks whether or not random access information is set to a cell (or a transmission timing group) specified by the base station apparatus 3 to execute the random access procedure (step S106). If random access information is set to the cell specified to execute the random access procedure, the mobile station apparatus 1-1 executes the non-contention based random access procedure in accordance with the random access specification information (step S107). If random access information is not set to the cell specified to execute the random access procedure, the mobile station apparatus 1-1 does not execute the non-contention based random access procedure.

Figure 6:
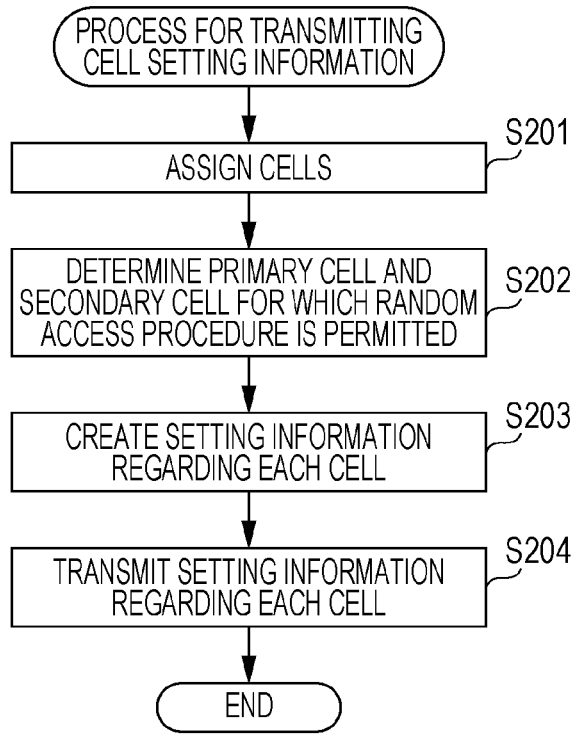
FIG. 6 is a flowchart illustrating an example of the operation of the base station apparatus at a time when the transmission timing message has been received.

The operation of the base station apparatus 3 will be described hereinafter with reference to a flowchart of FIG. 6.

The base station apparatus 3 assigns a plurality of cells to the mobile station apparatus 1-1 (step S201). The base station apparatus 3 determines, from among the plurality of assigned cells, a primary cell and a secondary cell for which the non-contention based random access procedure is permitted (step S202). The base station apparatus 3 creates setting information regarding each cell. The base station apparatus 3 then includes all the parameters of the random access information in setting information regarding the primary cell and part of the parameters of the random access information necessary for the non-contention based random access procedure in setting information regarding the secondary cell for which the non-contention based random access procedure is permitted (step S203). The base station apparatus 3 transmits the setting information regarding each cell to the mobile station apparatus 1-1 (step S204). It is to be noted that the base station apparatus 3 may set, independently for each cell, the setting values of the random access information to be set to the primary cell and the secondary cell.

Because of a change in a communication environment due to variation in a wireless transmission path environment or the like, the base station apparatus 3 might add or delete an assigned cell or change the cells, which are the primary cell and the secondary cell, for which the random access procedure is permitted. Transmission and reception processing operations of the base station apparatus 3 and the mobile station apparatus 1-1 relating to the random access information in such a case will be described hereinafter.

Here, an example will be described in which, when Cell 1 to Cell 3 are set in the same transmission timing group and Cell 4 and Cell 5 are set in the same transmission timing group and when Cell 1 is set as a primary cell and Cell 2 to Cell 5 are set as secondary cells, the primary cell is changed from Cell 1 to Cell 2 in a configuration in which the non-contention based random access procedure is permitted for Cell 5 (part of the random access information necessary for the non-contention based random access procedure is set).

When the primary cell is to be changed from Cell 1 to Cell 2 without changing the number of cells set in the configuration, the base station apparatus 3 transmits, as in the initial access, assignment information regarding cells, setting information regarding Cell 1 to Cell 5, group information regarding transmission timing groups, setting information set for each mobile station apparatus, and the like to the mobile station apparatus 1-1. It is to be noted that the base station apparatus 3 transmits these pieces of information to the mobile station apparatus 1-1 while including all the parameters of the random access information in the setting information regarding Cell 2 and part of the parameters of the random access information in the setting information regarding Cell 5. It is to be noted that, in this case, the base station apparatus 3 need not transmit the setting information regarding cells for which settings are not to be changed. That is, the base station apparatus 3 need not transmit the setting information regarding Cell 3 to Cell 5. The mobile station apparatus 1-1 continues to use the setting information that have been held (set) for the cells for which setting information has not been transmitted. That is, if setting information has not been transmitted for a cell (Cell 5) to which part of the random access information is set, the mobile station apparatus 1-1 recognizes that the non-contention based random access procedure is still permitted for the cell (Cell 5) on the basis of the set parameters.

When the base station apparatus 3 has newly transmitted the assignment information regarding the cells, the setting information regarding Cell 1 to Cell 5, the group information regarding the transmission timing groups, and the setting information set for each mobile station apparatus, the mobile station apparatus 1-1 sets the newly transmitted information in place of the information that has been held (set). In addition, the mobile station apparatus 1-1 recognizes that Cell 2 is set as the primary cell on the basis of the setting information regarding Cell 2.

Next, an example in which the cell for which the non-contention based random access procedure is permitted in the second transmission timing group is changed from Cell 5 to Cell 4 will be described. Here, an example of configuration will be described in which, when Cell 1 to Cell 3 are set in the same transmission timing group and Cell 4 and Cell 5 are set in the same transmission timing group and when Cell 2 is set as the primary cell and Cell 2 to Cell 5 are set as the secondary cells, the non-contention based random access procedure is permitted for Cell 5 (part of the random access information necessary for the non-contention based random access procedure is set).

When the cell for which the non-contention based random access procedure is permitted is to be changed from Cell 5 to Cell 4, the base station apparatus 3 transmits the setting information regarding Cell 4 and Cell 5 and the setting information set for each mobile station apparatus (setting information regarding an uplink reference signal and the like) regarding Cell 4 and Cell 5 to the mobile station apparatus 1-1. It is to be noted that the base station apparatus 3 transmits part of the parameters of the random access information necessary to execute the non-contention based random access procedure to the mobile station apparatus 1-1 while including the part of the parameters in the setting information regarding Cell 4. It is to be noted that the base station apparatus 3 need not transmit the setting information regarding Cell 1 to Cell 3. In addition, when the base station apparatus 3 transmits the setting information regarding Cell 1 to Cell 3, the base station apparatus 3 need not include the random access information in the setting information regarding Cell 1.

Upon newly receiving the setting information regarding Cell 4 and Cell 5, the mobile station apparatus 1-1 sets the newly transmitted setting information regarding Cell 4 and Cell 5 in place of the setting information regarding Cell 4 and Cell 5 that has been held (set). Since part of the parameters of the random access information is included in the new setting information regarding Cell 4, the mobile station apparatus 1-1 recognizes that the non-contention based random access procedure is now permitted for Cell 4. In addition, since the setting information regarding the primary cell has not been received, the mobile station apparatus 1-1 recognizes that no change has been made to the setting information regarding the primary cell, and maintains the setting information regarding Cell 1. It is to be noted that, in this case, the base station apparatus 3 may transmit setting information including the random access information for Cell 4 and setting information that does not include the random access information for Cell 5.

Upon receiving the setting information that does not include the random access information for Cell 5, the mobile station apparatus 1-1 releases (discards) part of the random access information that has been held (set). That is, when part of the random access information has not been transmitted as new setting information for a cell (Cell 5), the mobile station apparatus 1-1 recognizes that the non-contention based random access procedure (and non-contention based random access) is not permitted for the cell (Cell 5) after addition, deletion, or change of cells.

As described above, when the base station apparatus 3 sets the primary cell again, the base station apparatus 3 transmits all the necessary random access information to a cell for which both the contention based random access procedure and the non-contention based random access procedure are to be permitted. When the base station apparatus 3 sets the cell for which the non-contention based random access procedure is permitted again, the base station apparatus 3 can reduce the amount of random access information transmitted to the secondary cells by transmitting part of the random access information necessary for the non-contention based random access procedure to a target secondary cell.

Although an embodiment of the present invention has been described in detail with reference to the drawings, the specific configuration is not limited to that described above, and various design changes or the like may be made without deviating from the scope of the present invention.

For example, as the random access information set for a secondary cell, a case in which all the random access information is set or a case in which part of the random access information is set may be arbitrarily selected by the base station apparatus 3 depending on the situation. In this case, (i) when all the necessary random access information has been transmitted for the secondary cell, the mobile station apparatus 1-1 executes either the contention based random access procedure or the non-contention based random access procedure using the secondary cell on the basis of the random access specification information from the base station apparatus 3 and (ii) when part of the random access information has been transmitted, the mobile station apparatus 1-1 executes the non-contention based random access procedure on the basis of the random access specification information from the base station apparatus 3. It is to be noted that, even in this case, the random access procedure performed by the mobile station apparatus 1-1 for the primary cell remains the same.

In addition, although the mobile station apparatus 1-1 and the base station apparatus 3 according to the embodiment have been described with reference to the functional block diagrams for convenience of description, a program for realizing the function of each component of the mobile station apparatus 1-1 and the base station apparatus 3 may be recorded on a computer-readable recording medium. The program recorded on the recording medium may be read and executed by a computer system in order to control mobile station apparatuses and a base station apparatus. It is to be note that the "computer system" herein includes hardware such as an OS (Operating System) and a peripheral device.

In addition, the "computer-readable recording medium" refers to a portable medium such as a flexible disk, a magneto-optical disk, a ROM (Read Only Memory), or a CD (Compact Disc)-ROM or a storage device such as a hard disk incorporated into the computer system. Furthermore, the "computer-readable recording medium" includes a medium that dynamically holds the program for a short period of time, such as a communication line at a time when the program is transmitted through a network such as the Internet or a communication line such as a telephone line and a medium that holds the program for a certain period of time, such as a volatile memory in the computer system that serves as a server or a client in such a case. In addition, the program may be one for realizing part of the above-described functions or may be one that is capable of realizing the above-described functions in combination with programs that have already been recorded in the computer system.

In addition, each functional block used in the above embodiment may be realized as an LSI, which is typically an integrated circuit. Each functional block may be individually realized as a chip, or part or all of the functional blocks may be integrated and realized as a chip. In addition, in a method for realizing the functional blocks as an integrated circuit, not an LSI but a dedicated circuit or a general-purpose processor may be used. In addition, if a technology for realizing the functional blocks as an integrated circuit that replaces the LSI is developed as a result of the evolution of semiconductor technologies, an integrated circuit realized by the technology may be used.

Although an embodiment of the present invention has been described above in detail with reference to the drawings, the specific configuration is not limited to the embodiment, and designs and the like that do not deviate from the scope of the present invention are also included in the claims.

REFERENCE SIGNS LIST 1-1 to 1-3 mobile station apparatus, 3 base station apparatus, 5-1 and 5-2 repeater, 101 and 201 wireless unit, 103 and 203 transmission processing unit, 115 and 215 reception processing unit, 105 and 205 modulation unit, 117 and 217 demodulation unit, 107 and 207 transmission HARQ processing unit, 119 and 219 reception HARQ processing unit, 109 and 209 control unit, 121 mobile station management unit, 221 base station management unit, 123 UL schedule section, 125 and 225 control data creation section, 127 and 227 control data analysis section, 129 and 229 cell management section, 131 and 231 TA management section, 111 uplink reference signal generation unit, 211 downlink reference signal generation unit, 113 random access preamble generation unit, 213 preamble detection unit, 223 DL/UL schedule section.

The invention claimed is:

1. A mobile station apparatus to which a plurality of cells are assigned from a base station apparatus, the mobile station apparatus comprising:
   first circuitry configured or programmed to receive a plurality of setting information from the base station apparatus, wherein
      one of the setting information regarding one of the plurality of cells includes parameters for random access, and
      other of the setting information includes some of said parameters, said other of the setting information regarding at least one of other cells than said one of the plurality of cells; and
   second circuitry configured or programmed to:
      execute a random access procedure using said one of the setting information during communication with the base station apparatus; and
      execute a random access procedure using said other of the setting information during communication with the base station apparatus.

2. The mobile station apparatus according to claim 1, wherein
   the mobile station apparatus performs the random access using said other of the setting information.

3. A base station apparatus that assigns a plurality of cells to a mobile station apparatus, the base station apparatus comprising:
   first circuitry configured or programmed to transmit a plurality of setting information to the mobile station apparatus, wherein
      one of the setting information regarding one of the plurality of cells includes parameters for random access, and
      other of the setting information includes some of said parameters, said other of the setting information regarding at least one of other cells than said one of the plurality of cells; and
   second circuitry configured or programmed to:
      detect a random access preamble transmitted by the mobile station apparatus using said one of the setting information during communication with the mobile station apparatus; and
      detect a random access preamble transmitted by the mobile station apparatus using said other of the setting information during communication with the mobile station apparatus.

4. The base station apparatus according to claim 3, wherein
   the random access is performed by the mobile station apparatus using said other of the setting information.

5. A processing method performed in a mobile station apparatus to which a plurality of cells are assigned from a base station apparatus, the processing method comprising:
   receiving a plurality of setting information from the base station apparatus, wherein
      one of the setting information regarding one of the plurality of cells includes parameters for random access, and other of the setting information includes some of said parameters, said other of the setting information regarding at least one of other cells than said one of the plurality of cells;

executing a random access procedure using said one of the setting information during communication with the base station apparatus; and executing a random access procedure using said other of the setting information during communication with the base station apparatus.

6. The processing method according to claim 5, wherein the mobile station apparatus performs the random access using said other of the setting information.

7. A processing method performed in a base station apparatus that assigns a plurality of cells to a mobile station apparatus, the processing method comprising:

transmitting a plurality of setting information to the mobile station apparatus, wherein one of the setting information regarding one of the plurality of cells includes parameters for random access, and other of the setting information includes some of said parameters, said other of the setting information regarding at least one of other cells than said one of the plurality of cells;

detecting a random access preamble transmitted by the mobile station apparatus using said one of the setting information during communication with the mobile station apparatus; and detecting a random access preamble transmitted by the mobile station apparatus using said other one of the setting information during communication with the mobile station apparatus.

8. The processing method according to claim 7, wherein the random access is performed by the mobile station apparatus using said other of the setting information.

* * * * *